US011847496B2

(12) United States Patent
Sheoran et al.

(10) Patent No.: US 11,847,496 B2
(45) Date of Patent: Dec. 19, 2023

(54) SYSTEM AND METHOD FOR TRAINING AND SELECTING EQUIVALENCE CLASS PREDICTION MODULES FOR RESOURCE USAGE PREDICTION

(71) Applicant: Adobe Inc., San Jose, CA (US)

(72) Inventors: Nikhil Sheoran, Chandigarh (IN); Subrata Mitra, Whitefield (IN)

(73) Assignee: Adobe Inc., San Jose, CA (US)

(*) Notice: Subject to any disclaimer, the term of this patent is extended or adjusted under 35 U.S.C. 154(b) by 186 days.

(21) Appl. No.: 17/082,413

(22) Filed: Oct. 28, 2020

(65) Prior Publication Data

US 2022/0129316 A1 Apr. 28, 2022

(51) Int. Cl.
*G06F 9/50* (2006.01)
*G06N 20/00* (2019.01)

(52) U.S. Cl.
CPC .......... *G06F 9/5011* (2013.01); *G06F 9/5083* (2013.01); *G06N 20/00* (2019.01)

(58) Field of Classification Search
CPC ...... G06F 9/5011; G06F 9/5083; G06N 20/00
See application file for complete search history.

(56) References Cited

U.S. PATENT DOCUMENTS 7,401,012 B1* 7/2008 Bonebakker ............ H04L 43/08
703/22
11,138,049 B1* 10/2021 Featonby ............ G06F 11/3447
2017/0286176 A1* 10/2017 Artman ................. G06F 9/5027
2019/0147364 A1* 5/2019 Alt .......................... G06N 20/10
706/12
2019/0213099 A1* 7/2019 Schmidt ................. G06N 3/044
2021/0342199 A1* 11/2021 Bhatnagar ............. G06F 9/5083

OTHER PUBLICATIONS

Ogbuabor et al. "Clustering algorithm for a healthcare dataset using silhouette score value", International Journal of Computer Science & Information Technology 102.2018 (2018): 27-37 (Year: 2018).*
Nwanganga et al. "Using structural similarity to predict future workload behavior in the cloud." 2019 IEEE 12th International Conference on Cloud Computing (Cloud). IEEE, pp. 132-136. (Year: 2019).*

(Continued)

*Primary Examiner* — Bradley A Teets
*Assistant Examiner* — Willy W Huaracha
(74) *Attorney, Agent, or Firm* — FIG. 1 Patents

(57) ABSTRACT

A digital environment includes multiple computing nodes and a scheduling system that assigns workloads to computing nodes. The scheduling system includes an equivalence-class-based resource usage prediction system that receives a workload request and predicts an equivalence class for that workload request based on resource usage over time by the workload request or metadata associated with the workload request. The scheduling system also includes a workload assignment system that assigns the workload request to one or more of the computing nodes based on the predicted equivalence class. The number of equivalence classes is small relative to the total number of workloads that are scheduled (as an example, 10 to 15 equivalence classes for a total number of workloads in the tens or hundreds of thousands).

20 Claims, 6 Drawing Sheets

(56) References Cited

OTHER PUBLICATIONS

A Comparative Analysis of Partitioning Based Clustering Algorithms and Applications, International Journal of Engineering Research and Technology (IJERT) ISSN:2278-0181 vol. 2 Issue 12, pp. 412-424. (Year: 2013).*

"Apache Druid", Apache Software Foundation [retrieved Dec. 13, 2020]. Retrieved from the Internet <https://druid.apache.org/>., Jul. 21, 2020, 4 pages.

"Apache Kafka", Apache Software Foundation [retrieved Dec. 13, 2020]. Retrieved from the Internet :<URL:http://kafka.apache.org/>., 2017, 4 pages.

"Apache Spark", Apache Software Foundation [retrieved Dec. 13, 2020]. Retrieved from the Internet:<URL:http://spark.apache.org/>., 2018, 5 pages.

"Apache Storm", Apache Software Foundation [retrieved Dec. 13, 2020]. Retrieved from the Internet:<URL:http://stormapache.org/>., Feb. 19, 2018, 4 pages.

"Docker Swarm", Docker, Inc. Docker Documentation [retrieved Dec. 13, 2020]. Retrieved from the Internet <https://docs.docker.com/engine/swarm/how-swarm-mode-works/services/>., Jul. 2019, 5 pages.

"Kubernetes Scheduler", Kubernetes Website [retrieved Dec. 13, 2020]. Retrieved from the Internet <https://kubernetes.io/docs/concepts/scheduling-eviction/kube-scheduler/>., Oct. 22, 2020, 2 pages.

"Mesos Allocation Modules", Apache Software Foundation [retrieved Dec. 14, 2020]. Retrieved from the Internet <http://mesos.apache.org/documentation/latest/allocation-module/>., Oct. 23, 2013, 3 pages.

"Modernize your app's lifecycle with CI/CD pipelines and DevOps tools in the cloud", Microsoft [retrieved Dec. 14, 2020]. Retrieved from the Internet: <URL:https://docs.microsoft.com/en-us/dotnet/architecture/modernize-with-azure-containers/modernize-existing-apps-to-cloud-optimized/life-cycle-ci-cd-pipelines-devops-tools>., Apr. 30, 2018, 2 pages.

"NGINX—High Performance Load Balancer, Web Server", F5, INC. [retrieved Dec. 13, 2020]. Retrieved from the Internet <URL:https://www.nginx.com//>., 2019, 4 pages.

"Prometheus—Monitoring system & time series database", Prometheus Website [retrieved Dec. 13, 2020]. Retrieved from the Internet <https://prometheus.io/>., 2019, 6 pages.

"Resource Bin Packing for Extended Resources", Kubernetes Website [retrieved Dec. 13, 2020]. Retrieved from the Internet <https://kubernetes.io/docs/concepts/scheduling-eviction/resource-bin-packing/>., Nov. 17, 2020, 4 pages.

Abadi, Martin et al., "TensorFlow: A System for Large-Scale Machine Learning", Proceedings of the 12th USENIX Symposium on Operating Systems Design and Implementation [retrieved on Dec. 13, 2020]. Retrieved from the Internet: <URL:https://www.usenix.org/system/files/conference/osdi16/osdi16-abadi.pdf>., Nov. 2016, 21 pages.

Agarwal, Sameer et al., "Re-optimizing Data-Parallel Computings", Presented as part of the 9th {USENIX} Symposium on Networked Systems Design and Implementation [retrieved Dec. 13, 2020]. Retrieved from the Internet: <URL:https://www.usenix.org/system/files/conference/nsdi12/nsdi12-final228.pdf>., Apr. 2012, 14 pages.

Ahn, Jeongseob et al., "Dynamic Virtual Machine Scheduling in Clouds for Architectural Shared Resources", Presented as part of 4th USENIX Workshop on Hot Topics in Cloud Computing [retrieved Dec. 13, 2020]. Retrieved from the Internet: <URL:https://www.usenix.org/system/files/conference/hotcloud12/hotcloud12-final16.pdf>., Jun. 2012, 5 pages.

Alam, Mansaf et al., "Analysis and Clustering of Workload in Google Cluster Trace based on Resource Usage", In 2016 IEEE Intl conference on computational science and engineering (CSE) and IEEE Intl conference on embedded and ubiquitous computing (EUC) and 15th Intl symposium on distributed computing and applications for business engineering (DCABES)., [retrieved Dec. 13, 2020]. Retrieved from the Internet: <URL:https://arxiv.org/ftp/arxiv/papers/1501/1501.01426.pdf>., Aug. 2016, 6 pages.

Alibaba Group, , "Alibaba Cluster Data", Github [retrieved Dec. 13, 2020]. Retrieved from the Internet: <URL:https://github.com/alibaba/clusterdata>., 2020, 4 pages.

Amazon Web Services, Inc., , "Amazon EC2 Auto-Scaling", AWS Blog [retrieved Dec. 14, 2020]. Retrieved from the Internet: <URL:https://aws.amazon.com/ec2/autoscaling/#:~:text=Predictive%20Scaling%2C%20a%20feature%20of,of%20EC2%20instances%20in%20advance>., 2020, 7 pages.

Amazon Web Services, Inc., , "Amazon Rekognition: Automate your image and video analysis with machine learning", AWS Blog [retrieved Dec. 11, 2020]. Retrieved from the Internet: <URL:https://aws.amazon.com/rekognition/?blog-cards.sort-by=item.additionalFields.createdDate&blog-cards.sort-order=desc>., 2020, 17 pages.

Amvrosiadis, George et al., "On the diversity of cluster workloads and its impact on research results", Proceedings ofthe 2018 USENIX Annual Technical Conference (USENIX ATC '18), [retrieved Dec. 13, 2020]. Retrieved from the Internet: <URL:https://www.usenix.org/conference/atc18/presentation/amvrosiadis>., Jul. 2018, 15 pages.

Beloglazov, Anton et al., "Energy Efficient Resource Management in Virtualized Cloud Data Centers", 2010 10th IEEE/ACM International Conference on Cluster, Cloud and Grid Computing [retrieved Jan. 11, 2021]. Retrieved from the Internet <http://citeseerx.ist.psu.edu/viewdoc/download?doi=10.1.1.231.4888&rep=rep1&type=pdf>., Jan. 2010, 6 pages.

Blue Yonder GMBH, , "tsfresh: Automatic extraction of relevant features from time series", Github [retrieved Dec. 13, 2020]. Retrieved from the Internet <https://github.com/blue-yonder/tsfresh/>., Feb. 1, 2017, 5 pages.

Boehm, Matthias et al., "SystemML: Declarative Machine Learning on Spark", Proceedings of the VLDB Endowment, vol. 9, No. 13 [retrieved Dec. 13, 2020]. Retrieved from the Internet: <URL:http://www.vldb.org/pvldb/vol9/p1425-boehm.pdf>., Sep. 2016, 12 pages.

Boutin, Eric et al., "Apollo: Scalable and Coordinated Scheduling for Cloud-Scale Computing", Proceedings ofthe 11th USENIX Symposium on Operating Systems Design and Implementation [retrieved Dec. 13, 2020]. Retrieved from the Internet: <URL:http://www.cs.columbia.edu/~jrzhou/pub/osdi14-paper-boutin.pdf>., Oct. 2014, 17 pages.

Boyan, Justin A. et al., "Packet Routing in Dynamically Changing Networks: A Reinforcement Learning Approach", Advances in Neural Information Processing Systems, 1999 [retrieved Jan. 11, 2021]. Retrieved from the Internet: <https://papers.nips.cc/paper/1993/file/4ea06fbc83cdd0a06020c35d50e1e89a-Paper.pdf>., Nov. 1993, 8 pages.

Burke, Gareth, "IBM best practices for implementing a CI/CD secure container image pipeline for your Kubernetes-based apps", IBM Developer [retrieved Dec. 13, 2020]. Retrieved from the Internet <https://developer.ibm.com/technologies/containers/articles/ibm-best-practices-for-the-kubernetes-cicd-secure-container-image-pipeline/>., Nov. 4, 2018, 12 pages.

Burns, Brendan et al., "Borg, Omega, and Kubernetes", acmqueue vol. 14, Issue 1 [retrieved Dec. 13, 2020]. Retrieved from the Internet <https://dl.acm.org/ft_gateway.cfm?id=2898444&ftid=1693821&dwn=1>., Mar. 2, 2016, 24 pages.

Chen, Li et al., "AuTO: Scaling Deep Reinforcement Learning for Datacenter-Scale Automatic Traffic Optimization", SIGCOMM '18: Proceedings of the 2018 Conference of the ACM Special Interest Group on Data Communication [retrieved on Dec. 13, 2020]. Retrieved online from: <https://conferences.sigcomm.org/events/apnet2018/papers/auto.pdf>., Aug. 2018, 15 pages.

Chen, Yanpei et al., "Analysis and Lessons from a Publicly Available Google Cluster Trace", Electrical Engineering and Computer Sciences University of California at Berkeley [retrieved Dec. 11, 2020]. Retrieved from the Internet: <https://www2.eecs.berkeley.edu/Pubs/TechRpts/2010/EECS-2010-95.pdf>., Jun. 14, 2010, 11 pages.

Chinchali, Sandeep et al., "Cellular Network Traffic Scheduling with Deep Reinforcement Learning", Proceedings of the AAAI Conference on Artificial Intelligence. vol. 32. No. 1. [retrieved Dec.

(56) References Cited

OTHER PUBLICATIONS 13, 2020]. Retrieved from the Internet: <http://asl.stanford.edu/wp-content/papercite-data/pdf/Chinchali.ea.AAAI18.pdf>., Apr. 25, 2018, 9 pages.

Christ, Maximilian et al., "Distributed and parallel time series feature extraction for industrial big data applications", arXiv.org [retrieved Dec. 13, 2020]. Retrieved from the Internet: <https://arxiv.org/pdf/1610.07717.pdf>., May 19, 2017, 36 pages.

Cortez, Eli et al., "Resource Central: Understanding and Predicting Workloads for Improved Resource Management in Large Cloud Platforms", SOSP '17: Proceedings of the 26th Symposium on Operating Systems Principles [retrieved Dec. 13, 2020]. Retrieved from the Internet: <https://www.microsoft.com/en-us/research/wp-content/uploads/2017/10/Resource-Central-SOSP17.pdf>., Oct. 2017, 15 pages.

Delimitrou, Christina et al., "Paragon: QoS-Aware Scheduling for Heterogeneous Datacenters", ACM SIGPLAN Notices [retrieved Dec. 13, 2020]. Retrieved from the Internet: <https://web.stanford.edu/~kozyraki/publications/2013.paragon.asplos.pdf>., Mar. 2013, 12 pages.

Delimitrou, Christina et al., "Quasar: Resource-Efficient and QoS-Aware Cluster Management", ACM SIGPLAN Notices vol. 49, No. 4 [retrieved Dec. 13, 2020]. Retrieved from the Internet <URL:https://www.csl.cornell.edu/~delimitrou/papers/2014.asplos.guasar.pdf>., Feb. 2014, 17 pages.

Ding, Hui et al., "Querying and Mining of Time Series Data: Experimental Comparison of Representations and Distance Measures", Proceedings of the VLDB Endowment vol. 1, No. 2 [retrieved Dec. 13, 2020]. Retrieved from the Internet <Url:https://www.cs.ucr.edu/~eamonn/vldb_08_Experimental_comparison_time_series.pdf>., Aug. 2008, 11 pages.

Dormando, et al., "Memcached", MEMCACHED [retrieved Dec. 13, 2020]. Retrieved from the Internet <http://memcached.org/>, 2003, 2 pages.

Ferguson, Andrew D. et al., "Jockey: Guaranteed Job Latency in Data Parallel Clusters", EuroSys '12: Proceedings of the 7th ACM european conference on Computer Systems [retrieved Dec. 13, 2020]. Retrieved from the Internet: <https://people.eecs.berkeley.edu/~kubitron/courses/csZ62a/handouts/papers/Jockey.pdf>., Apr. 2012, 14 pages.

Gan, Yu et al., "Leveraging Deep Learning to Improve the Performance Predictability of Cloud Microservices", arXiv.org [retrieved Dec. 13, 2020]. Retrieved from the Internet: <URL:https://arxiv.org/pdf/1905.00968.pdf>., May 2, 2019, 15 pages.

Gan, Yu et al., "Seer: Leveraging Big Data to Navigate the Complexity of Performance Debugging in Cloud Microservices", ASPLOS '19: Proceedings of the Twenty-Fourth International Conference on Architectural Support for Programming Languages and Operating Systems [retrieved Dec. 13, 2020]., Retrieved from the Internet: <URL:https://www.csl.cornell.edu/~delimitrou/papers/2019.asplos.seer.pdf>, Apr. 2019, 15 pages.

Garefalakis, Panagiotis et al., "MEDEA: Scheduling of Long Running Applications in Shared Production Clusters", EuroSys '18: Proceedings of the Thirteenth EuroSys Conference [retrieved Dec. 13, 2020]. Retrieved from the Internet: <https://lsds.doc.ic.ac.uk/sites/default/files/medea-eurosys18.pdf>, Apr. 2018, 13 pages.

Ghodsi, Ali et al., "Choosy: Max-Min Fair Sharing for Datacenter Jobs with Constraints", EuroSys '13: Proceedings of the 8th ACM European Conference on Computer Systems [retrieved Dec. 13, 2020]. Retrieved from the Internet: <https://cs.stanford.edu/~matei/papers/2013/eurosys_choosy.pdf>, Apr. 2013, 14 pages.

Ghodsi, Ali et al., "Dominant Resource Fairness: Fair Allocation of Multiple Resource Types", NSDI'11: Proceedings of the 8th USENIX conference on Networked systems design and implementation [retrieved Dec. 13, 2020]. Retrieved from the Internet: <https://www.usenix.org/legacy/events/nsdi11/tech/full_papers/Ghodsi.pdf>., Mar. 2011, 14 pages.

Ghodsi, Ali et al., "Multi-Resource Fair Queueing for Packet Processing", SIGCOMM '12: Proceedings of the ACM SIGCOMM 2012 conference on Applications, technologies, architectures, and protocols for computer communication [retrieved Dec. 13, 2020]., Retrieved from the Internet: <https://www.usenix.org/legacy/events/nsdi11/tech/full_papers/Ghodsi.pdf>., Aug. 2012, 12 pages.

Ghribi, Chaima et al., "Energy Efficient VM Scheduling for Cloud Data Centers: Exact allocation and migration algorithms", 13th IEEE/ACM International Symposium on Cluster, Cloud, and Grid Computing, Delft [retrieved Dec. 13, 2020]., Retrieved from the Internet: <https://www.researchgate.net/publication/261093539_Energy_Efficient_VM_Scheduling_for_Cloud_Data_Centers_Exact_Allocation_and_Migration_Algorithms/link/547229c50cf24af340c531b9/download>., May 2013, 8 pages.

Gog, Ionel et al., "Firmament: Fast, Centralized Cluster Scheduling at Scale", Proceedings of the 12th USENIX Symposium on Operating Systems Design and Implementation (OSDI '16) Savannah, GA [retrieved on Dec. 13, 2020]. Retrieved from the Internet: <https://www.usenix.org/system/files/conference/osdi16/osdi16-gog.pdf>., Nov. 2016, 19 pages.

Gong, Zhenhuan et al., "PRESS: PRedictive Elastic ReSource Scaling for cloud systems", 2010 International Conference on Network and Service Management, Niagara Falls, on [retrieved Dec. 13, 2020]. Retrieved from the Internet: <URL:https://www.csc.ncsu.edu/enews/media/PRESS.pdf>., Oct. 2010, 8 pages.

Google, , "cadvisor: Analyzes resource usage and performance characteristics of running containers", GitHub [retrieved Dec. 13, 2020]. Retrieved from the Internet: <https://github.com/google/cadvisor>, Nov. 2014, 4 pages.

Grandl, Robert et al., "Multi-Resource Packing for Cluster Schedulers", ACM SIGCOMM Computer Communication Review vol. 44, No. 4 [retrieved Dec. 13, 2020]. Retrieved from the Internet: <https://www.cs.cmu.edu/~xia/resources/Documents/grandl_sigcomm14.pdf>., Aug. 2014, 12 pages.

Gu, Shixiang et al., "Deep reinforcement learning for robotic manipulation with asynchronous off-policy updates", 2017 IEEE International Conference on Robotics and Automation (ICRA), Singapore [retrieved Dec. 13, 2020]. Retrieved from the Internet <https://arxiv.org/pdf/1610.00633.pdf>., Nov. 23, 2016, 9 pages.

Haque, MD E. et al., "Few-to-Many: Incremental Parallelism for Reducing Tail Latency in Interactive Services", ACM SIGPLAN Notices vol. 50, No. 4 [retrieved Dec. 13, 2020]. Retrieved from the Internet: <URL:https://www.microsoft.com/en-us/research/wp-content/uploads/2016/02/FINAL-asplos168-hagueA.pdf>., Mar. 2015, 15 pages.

Hellerstein, Joseph L. , "Google Cluster Data", Google AI Blog [retrieved Dec. 11, 2020]. Retrieved from the Internet: <https://ai.googleblog.com/2010/01/google-cluster-data.html>., Jan. 7, 2010, 2 pages.

Hindman, Benjamin et al., "Mesos: a Platform for Fine-Grained Resource Sharing in the Data Center", USENIX Symposium on Networked Systems Design and Implementation [retrieved Dec. 13, 2020]. Retrieved from the Internet: <https://www.usenix.org/legacy/events/nsdi11/tech/full_papers/Hindman.pdf>., Apr. 2011, 14 pages.

Hoefler, Torsten et al., "Characterizing the Influence of System Noise on Large-Scale Applications by Simulation", SC '10: Proceedings of the 2010 ACM/IEEE International Conference for High Performance Computing, Networking, Storage and Analysis, New Orleans, LA [retrieved Dec. 13, 2020]., Retrieved from the Internet <http://people.cs.pitt.edu/~jacklange/teaching/cs3510-s14/papers/noise.pdf>., Nov. 2010, 11 pages.

Isard, Michael et al., "Quincy: Fair Scheduling for Distributed Computing Clusters", SOSP '09: Proceedings of the ACM SIGOPS 22nd symposium on Operating systems principles [retrieved Dec. 13, 2020]. Retrieved from the Internet: <https://www.sigops.org/s/conferences/sosp/2009/papers/isard-sosp09.pdf>., Oct. 2009, 20 pages.

Joe-Wong, Carlee et al., "Multi-Resource Allocation: Fairness-Efficiency Tradeoffs in a Unifying Framework", IEEE/ACM Transactions on Networking, vol. 21, No. 6 [retrieved Dec. 13, 2020]. Retrieved from the Internet: <https://www.andrew.cmu.edu/user/cjoewong/Fairness_Infocom.pdf>., Jan. 4, 2013, 26 pages.

Kaufman, Leonard et al., "Clustering by Means of Medoids", [retrieved Dec. 13, 2020]. Retrieved from the Internet: <https://www.researchgate.net/publication/243777819_Clustering_by_Means_of_Medoids/link/00b7d531493fad342c000000/download>., Jan. 1987, 12 pages.

(56) References Cited

OTHER PUBLICATIONS

Kim, Hwanju et al., "Task-aware Virtual Machine Scheduling for I/O Performance", VEE '09: Proceedings of the 2009 ACM SIGPLAN/SIGOPS international conference on Virtual execution environments, Mar. 2009, 10 pages.

Kornacker, Marcel et al., "Impala: a Modern, Open-Source SQL Engine for Hadoop", 7th Biennial Conference on Innovative Data Systems Research (CIDR'15), Asilomar, CA [retrieved Dec. 13, 2020]. Retrieved from the Internet: <http://pandis.net/resources/cidr15impala.pdf>., Nov. 2014, 10 pages.

Lai, Guokun et al., "Modeling Long- and Short-Term Temporal Patterns with Deep Neural Networks", SIGIR '18: the 41st International ACM SIGIR Conference on Research & Development in Information Retrieval [retrieved Dec. 13, 2020]. Retrieved from the Internet: <URL:https://arxiv.org/pdf/1703.07015.pdf>., Apr. 18, 2018, 11 pages.

Leverich, Jacob et al., "Reconciling High Server Utilization and Sub-millisecond Quality-of-Service", EuroSys '14: Proceedings of the Ninth European Conference on Computer Systems, Amsterdam, Netherlands [retrieved Dec. 13, 2020]. Retrieved from the Internet <https://web.stanford.edu/~kozyraki/publications/2014.mutilate.eurosys.pdf>., Apr. 2014, 14 pages.

Liu, Qixiao et al., "The Elasticity and Plasticity in Semi-Containerized Co-locating Cloud Workload: a View from Alibaba Trace", Proceedings of the ACM Symposium on Cloud Computing (SoCC '18). Association for Computing Machinery, New York, NY [retrieved Dec. 13, 2020]. Retrieved from the Internet <https://pdfs.semanticscholar.org/7bd3/f982214f7e8012118bda1a8765ee764bacd0.pdf>., Oct. 2018, 34 pages.

Liu, Zitao et al., "Characterizing Machines and Workloads on a Google Cluster", 2012 41st International Conference on Parallel Processing Workshops, Pittsburgh, PA [retrieved Dec. 13, 2020]. Retrieved from the Internet: <URL:https://pdfs.semanticscholar.org/7bd3/f982214f7e8012118bda1a8765ee764bacd0.pdf>., Sep. 2012, 7 pages.

Lo, David et al., "Heracles: Improving Resource Efficiency at Scale", ISCA '15: Proceedings of the 42nd Annual International Symposium on Computer Architecture, Portland, OR [retrieved Jan. 26, 2021]. Retrieved from the Internet <https://dl.acm.org/doi/pdf/10.1145/2749469.2749475>., Jun. 2015, 13 pages.

Lu, Chengzhi et al., "Imbalance in the Cloud: an Analysis on Alibaba Cluster Trace", 2017 IEEE International Conference on Big Data (Big Data), Boston, MA [retrieved Dec. 13, 2020]. Retrieved from the Internet <http://cloud.siat.ac.cn/~ye/Imbalance_Ye_2017.pdf>., Dec. 2017, 9 pages.

Mace, Jonathan et al., "Retro: Targeted Resource Management in Multi-tenant Distributed Systems", In Proceedings of the 12th USENIX Symposium on Networked Systems Design and Implementation (NSDI '15) Oakland, CA [retrieved on Dec. 13, 2020]. Retrieved from the Internet <https://www.usenix.org/system/files/conference/nsdi15/nsdi15-paper-mace.pdf>., May 2015, 16 pages.

MacQueen, J. , "Some Methods for Classification and Analysis of Multivariate Observations", Proceedings of the fifth Berkeley Symposium on Mathematical Statistics and Probability, vol. 1, No. 14 [retrieved Dec. 13, 2020]. Retrieved from the Internet <https://www.cs.cmu.edu/~bhiksha/courses/mlsp.fall2010/class14/macqueen.pdf>., 1967, pp. 281-297.

Mao, Hongzi et al., "Learning Scheduling Algorithms for Data Processing Clusters", SIGCOMM '19: Proceedings of the ACM Special Interest Group on Data Communication, Beijing, China [retrieved Jan. 26, 2021]. Retrieved from the Internet: <https://arxiv.org/pdf/1810.01963.pdf>., Aug. 2019, 19 pages.

Mao, Hongzi et al., "Neural Adaptive Video Streaming with Pensieve", SIGCOMM '17: Proceedings of the Conference of the ACM Special Interest Group on Data Communication, Los Angeles, CA [retrieved Dec. 13, 2020]. Retrieved from the Internet <https://people.csail.mit.edu/hongzi/content/publications/Pensieve-Sigcomm17.pdf>, Aug. 2017, 14 pages.

Mao, Hongzi , "Resource Management with Deep Reinforcement Learning", HotNets '16: Proceedings of the 15th ACM Workshop on Hot Topics in Networks [retrieved Dec. 13, 2020]. Retrieved from the Internet <https://people.csail.mit.edu/hongzi/content/publications/DeepRM-HotNets16.pptx>., Nov. 2016, 21 pages.

Mars, Jason et al., "Bubble-Up: Increasing Utilization in Modern Warehouse Scale Computers via Sensible Co-locations", MICRO-44: Proceedings of the 44th Annual IEEE/ACM International Symposium on Microarchitecture [retrieved Dec. 13, 2020]. Retrieved from the Internet: <URL:http://www.cs.virginia.edu/~skadron/Papers/mars_micro2011.pdf>., Dec. 2011, 12 pages.

Meng, Xiaoqiao et al., "Improving the Scalability of Data Center Networks with Traffic-aware Virtual Machine Placement", 2010 Proceedings IEEE Infocom, San Diego, CA [retrieved Dec. 13, 2020]. Retrieved from the Internet <https://www.cs.purdue.edu/homes/bb/cs590/papers/manoj.pdf>., Mar. 2010, 9 pages.

Mestres, Albert et al., "Knowledge-Defined Networking", ACM SIGCOMM Computer Communication Review [retrieved Dec. 13, 2020]. Retrieved from the Internet <https://arxiv.org/pdf/1606.06222.pdf>., Sep. 2017, 8 pages.

Mirhoseini, Azalia et al., "Device Placement Optimization with Reinforcement Learning", Proceedings of the 34th International Conference on Machine Learning, Sydney, Australia, PMLR [retrieved Dec. 13, 2020]. Retrieved from the Internet <https://arxiv.org/pdf/1706.04972.pdf>., Jun. 25, 2017, 11 pages.

Mishra, Asit K. et al., "Towards Characterizing Cloud Backend Workloads: Insights from Google Compute Clusters", ACM Sigmetrics Performance Evaluation Review 37, No. 4 [retrieved Dec. 13, 2020]. Retrieved from the Internet <http://pages.cs.wisc.edu/~akella/CS838/F12/838-CloudPapers/Appworkload.pdf>., Mar. 2010, 8 pages.

Mitra, Subrata et al., "DeepPlace: Learning to Place Applications in Multi-Tenant Clusters", Proceedings of the 10th ACM SIGOPS Asia-Pacific Workshop on Systems (APSys '19). Association for Computing Machinery, New York, NY [retrieved Oct. 13, 2020]. Retrieved from the Internet <https://arxiv.org/pdf/1907.12916.pdf>., Jul. 30, 2019, 8 pages.

Mitra, Subrata et al., "Phase-Aware Optimization in Approximate Computing", 2017 IEEE/ACM International Symposium on Code Generation and Optimization (CGO), Austin, TX [retrieved Dec. 13, 2020]. Retrieved from the Internet: <URL:http://misailo.cs.illinois.edu/papers/cgo_paper2017.pdf>., Feb. 2017, 12 pages.

Mnih, Volodymry et al., "Playing Atari with Deep Reinforcement Learning", arXiv.org Preprint [retrieved Dec. 13, 2020]. Retrieved from the Internet: <URL:https://arxiv.org/pdf/1312.5602.pdf>., Dec. 19, 2013, 9 pages.

Munos, Remi et al., "Safe and efficient off-policy reinforcement learning", NIPS'16: Proceedings of the 30th International Conference on Neural Information Processing Systems, Barcelona, Spain [retrieved Dec. 13, 2020]. Retrieved from the Internet: <URL:https://arxiv.org/pdf/1606.02647.pdf>., Jun. 8, 2016, 18 pages.

Nathuji, Ripal et al., "Q-Clouds: Managing Performance Interference Effects for QoS-Aware Clouds", EuroSys '10: Proceedings of the 5th European conference on Computer systems, Paris, France [retrieved Dec. 14, 2020]., Retrieved from the Internet: <https://www.researchgate.net/publication/221351669_Q-clouds_Managing_performance_interference_effects_for_QoS-aware_clouds/link/02e7e52cd6bb122f57000000/download>., Apr. 2010, 14 pages.

Novakovic, Dejan et al., "DeepDive: Transparently Identifying and Managing Performance Interference in Virtualized Environments", 2013 USENIX Annual Technical Conference [retrieved Dec. 14, 2020]. Retrieved from the Internet: <http://0b4af6cdc2f0c5998459-c0245c5c937c5dedcca3f1764ecc9b2f.r43.cf2.rackcdn.com/11759-atc13-novakovic.pdf>., Jun. 2013, 12 pages.

Padala, Pradeep et al., "Automated control of multiple virtualized resources", EuroSys '09: Proceedings of the 4th ACM European conference on Computer systems [retrieved Dec. 14, 2020]. Retrieved from the Internet <https://www.hpl.hp.com/techreports/2008/HPL-2008-123.pdf>., Apr. 2009, 17 pages.

Parkes, David C. et al., "Beyond Dominant Resource Fairness: Extensions, Limitations, and Indivisibilities", ACM Transactions on Economics and Computation Valencia, Spain, New York, NY: ACM Press [retrieved Dec. 14, 2020]. Retrieved from the Internet: <https://dash.harvard.edu/bitstream/handle/1/11956916/Parkes_Beyond-Dominant.pdf?sequence%3D1>., Mar. 2015, 18 pages.

(56) References Cited

OTHER PUBLICATIONS

Pedregosa, Fabian et al., "Scikit-learn: Machine Learning in Python", Scikit-learn Website [retrieved Dec. 14, 2020]. Retrieved from the Internet: <https://scikit-learn.org/stable/>., Oct. 2011, 7 pages.
Popa, Lucian et al., "FairCloud: Sharing the Network in Cloud Computing", SIGCOMM '12: Proceedings of the ACM SIGCOMM 2012 conference on Applications, technologies, architectures, and protocols for computer communication, Helsinki, Finland [retrieved Dec. 14, 2020]., Retrieved from the Internet: <https://people.eecs.berkeley.edu/~sylvia/papers/faircloud_sigcomm.pdf>., Aug. 2012, 12 pages.
Reiss, Charles et al., "Heterogeneity and Dynamicity of Clouds at Scale: Google Trace Analysis", SoCC '12: Proceedings ofthe Third ACM Symposium on Cloud Computing, San Jose, CA [retrieved Dec. 14, 2020]. Retrieved from the Internet: <https://www.pdl.cmu.edu/PDL-FTP/CloudComputing/googletrace-soch012.pdf>., Oct. 2012, 13 pages.
Ren, Kai et al., "Hadoop's Adolescence", Proceedings of the VLDB Endowment, vol. 6, No. 10 [retrieved Dec. 14, 2020]. Retrieved from the Internet: <URL:https://www.pdl.cmu.edu/PDL-FTP/associated/ren-vldb13.pdf>., Aug. 2013, 12 pages.
Ren, Rui et al., "Anomaly Analysis for Co-located Datacenter Workloads in the Alibaba Cluster", arXiv.org Preprint [retrieved Dec. 14, 2020]. Retrieved from the Internet: <https://arxiv.org/pdf/1811.06901.pdf>., Nov. 14, 2018, 12 pages.
Ren, Xiaoqi et al., "Hopper: Decentralized Speculation-aware Cluster Scheduling at Scale", SIGCOMM '15: Proceedings of the 2015 ACM Conference on Special Interest Group on Data Communication [retrieved Dec. 14, 2020]. Retrieved from the Internet: <https://conferences.sigcomm.org/sigcomm/2015/pdf/papers/p379.pdf>., Aug. 2015, 14 pages.
Rousseeuw, Peter J., "Silhouettes: a graphical aid to the interpretation and validation of cluster analysis", Journal of Computational and Applied Mathematics, vol. 20 [retrieved Jan. 26, 20201]., Retrieved from the Internet <https://reader.elsevier.com/reader/sd/pii/0377042787901257?token=89AF7AB56D71FCE441D87B4B4677F307EE1A9A642B6B9E96D01D14B89A3C15DAEAE9D018044B729E8B93A970BB426D20>., Jun. 13, 1986, pp. 53-65.
Sandvine, , "The Global Internet Phenomena Report", Sandvine Website [retrieved Jan. 26, 2021]. Retrieved from the Internet <https://www.sandvine.com/hubfs/Sandvine_Redesign_2019/Downloads/Internet%20Phenomena/Internet%20Phenomena%20Report%20Q32019%2020190910.pdf>., Sep. 2019, 23 pages.
Schwarzkopf, Malte et al., "Omega: flexible, scalable schedulers for large compute clusters", EuroSys '13: Proceedings ofthe 8th ACM European Conference on Computer Systems, Prague, Czech Republic [[retrieved Dec. 14, 2020]. Retrieved from the Internet: <https://static.googleusercontent.com/media/research.google.com/en//pubs/archive/41684.pdf>., Apr. 2013, 14 pages.
Suresh, Lalith et al., "C3: Cutting Tail Latency in Cloud Data Stores via Adaptive Replica Selection", 12th {USENIX} Symposium on Networked Systems Design and Implementation, Oakland, CA [retrieved Dec. 14, 2020]. Retrieved from the Internet: <https://www.usenix.org/system/files/conference/nsdi15/nsdi15-paper-suresh.pdf>., May 2015, 16 pages.
Sutton, Richard S. et al., "Reinforcement Learning: An Introduction", The MIT Press Cambridge, Massachusetts, Mar. 1, 1998, 398 pages.
Sysdig, , "Linux system exploration and troubleshooting tool with first class support for containers", GitHub [retrieved Dec. 13, 2020]. Retrieved from the Internet: <URL:https://github.com/draios/sysdig>., Apr. 2014, 5 pages.
Twitter, , "Heron", Heron [retrieved Dec. 18, 2020]. Retrieved from the Internet: <URL:https://web.archive.org/web/20180131172903/https://twitter.github.io/heron/>., 2018, 2 pages.
Valadarsky, Asaf et al., "Learning to Route", HotNets-XVI: Proceedings of the 16th ACM Workshop on Hot Topics in Networks [retrieved Dec. 14, 2020]. Retrieved from the Internet: <https://conferences.sigcomm.org/hotnets/2017/papers/hotnets17-final28.pdf>., Nov. 2017, 7 pages.

Vanga, Manohar et al., "Tableau: A High-Throughput and Predictable VM Scheduler for High-Density Workloads", EuroSys '18: Proceedings of the Thirteenth EuroSys Conference, New York, NY [retrieved Dec. 14, 2020]. Retrieved from the Internet: < URL:https://people.mpi-sws.org/~arpanbg/pdfs/eurosys2018_paper.pdf>., Apr. 2018, 16 pages.
Vavilapalli, Vinod K. et al., "Apache Hadoop YARN: Yet Another Resource Negotiator", SOCC '13: Proceedings of the 4th annual Symposium on Cloud Computing, Article No. 5 [retrieved Dec. 14, 2020]. Retrieved from the Internet <https://www.cse.ust.hk/~weiwa/teaching/Fall15-COMP6611B/reading_list/YARN.pdf>., Oct. 2013, 16 pages.
Venkataraman, Shivaram et al., "Ernest: Efficient Performance Prediction for Large-Scale Advanced Analytics", In the Proceedings of the 13th USENIX Symposium on Networked Systems Design and Implementation (NSDI '16) [retrieved Dec. 14, 2020]. Retrieved from the Internet: <https://www.usenix.org/system/files/conference/nsdi16/nsdi16-paper-venkataraman.pdf>., Mar. 2016, 17 pages.
Verma, Abhishek et al., "Large-scale cluster management at Google with Borg", EuroSys '15: Proceedings of the Tenth European Conference on Computer Systems, Article No. 18 Bordeaux, France [retrieved Dec. 14, 2020]. Retrieved from the Internet: <https://storage.googleapis.com/pub-tools-public-publication-data/pdf/43438.pdf>., Apr. 2015, 18 pages.
Xu, Ran et al., "Pythia: Improving Datacenter Utilization via Precise Contention Prediction for Multiple Co-located Workloads", Association for Computing Machinery, 19th International Middleware Conference (Middleware '18), Rennes, France [retrieved Dec. 14, 2020]. Retrieved from the Internet: <https://dl.acm.org/doi/pdf/10.1145/3274808.3274820>., Nov. 2018, 15 pages.
Xu, Yunjing et al., "Bobtail: Avoiding Long Tails in the Cloud", 10th USENIX Symposium on Networked Systems Design and Implementation (NSDI '13), Lombard, IL [retrieved Dec. 14, 2020]. Retrieved from the Internet: <https://www.usenix.org/system/files/conference/nsdi13/nsdi13-final77.pdf>., Apr. 2013, 13 pages.
Yang, Hailong et al., "Bubble-flux: precise online QoS management for increased utilization in warehouse scale computers", ACM SIGARCH Computer Architecture News, vol. 41, No. 3 [retrieved Dec. 14, 2020]. Retrieved from the Internet <http://cseweb.ucsd.edu/~abreslow/docs/pubs2013/ISCA13_HailongYang.pdf>., Jun. 2013, 12 pages.
Zhang, Jian et al., "Application Resource Demand Phase Analysis and Prediction in Support of Dynamic Resource Provisioning", Fourth International Conference on Autonomic Computing (ICAC'07), Jacksonville, FL [retrieved Dec. 14, 2020]., Retrieved from the Internet: <https://www.researchgate.net/publication/4261747_Application_Resource_Demand_Phase_Analysis_and_Prediction_in_Support_of_Dynamic_Resource_Provisioning/link/54bf11380cf28ce68e6b0ed8/download>., Jun. 2007, 2 pages.
Zhang, Qi et al., "Characterizing Task Usage Shapes in Google Compute Clusters", Proceedings of the 5th International Workshop on Large Scale Distributed Systems and Middleware [retrieved Dec. 11, 2020]. Retrieved from the Internet: <https://static.googleusercontent.com/media/research.google.com/en//pubs/archive/37201.pdf>., Sep. 2011, 6 pages.
Zhang, Xiao et al., "CPI2: CPU performance isolation for shared compute clusters", EuroSys '13: Proceedings of the 8th ACM European Conference on Computer Systems, Prague, Czech Republic [retrieved Dec. 14, 2020]. Retrieved from the Internet: <https://static.googleusercontent.com/media/research.google.com/en//pubs/archive/40737.pdf>., Apr. 2013, 13 pages.
Zhang, Yunqi et al., "SMiTe: Precise QoS Prediction on Real-System SMT Processors to Improve Utilization in Warehouse Scale Computers", 2014 47th Annual IEEE/ACM International Symposium on Microarchitecture, Cambridge, UK [retrieved Dec. 14, 2020]. Retrieved from the Internet <http://web.eecs.umich.edu/~profmars/wp-content/papercite-data/pdf/zhang14micro.pdf>., Dec. 2014, 13 pages.

* cited by examiner

SYSTEM AND METHOD FOR TRAINING AND SELECTING EQUIVALENCE CLASS PREDICTION MODULES FOR RESOURCE USAGE PREDICTION

BACKGROUND

As computer technology has advanced, applications and services have become increasingly complex and designed to run in various different manners. As an example, some applications and services are designed to operate on a collection of servers, such as a dedicated on-premise cluster of servers or a cloud service providing an application used by hundreds of thousands of users and employing a collection of servers to support all of those users accessing the application over the Internet.

It is inefficient from the resource usage perspective, and in most cases infeasible, to dedicate each server for running an individual application, service, or task. Hence, in practice multiple applications and services are put together in each of the servers. However, to run multiple applications within a single server, careful scheduling and predictions must be made to understand the future resource usage characteristics of the applications. Such resource usage predictions and associated scheduling ensures that each server has enough resources to sustain the applications or tasks assigned to it and thus should be able to provide good performance and experience to the end users.

Current application or task assignment solutions for assigning computational tasks to different servers are on a per computational task basis, analyzing requested computational tasks individually to predict resource usage by the computational task and identify an appropriate one of the collection of servers to assign the computational task to. Given the wide variety of computational tasks (including different resource usages at different times) and the large number of computational tasks that are to be assigned makes these current task assignment solutions inefficient as well as inaccurate. For example, the inefficiencies and inaccuracies of current task assignment solutions oftentimes lead to situations in which some servers are under-utilized, resulting in increased expenses due to wasted resources. Accordingly, the inefficiencies and inaccuracies of current task assignment solutions oftentimes result in user dissatisfaction and frustration with their applications and services providing access to those applications.

SUMMARY

To mitigate the drawbacks of conventional task assignment solutions, an equivalence-class-based resource usage prediction system as implemented by a scheduling system is described. Multiple resource usage histories are received, each indicating resource usage for one of multiple workloads that have previously been executed in a digital environment. For each of multiple distance metrics, a workload representation of each of multiple workloads is generated by applying the distance metric to the workload. A number of clusters to include in a set of multiple clusters into which the multiple workloads are grouped is determined, each of the multiple clusters corresponding to one of multiple equivalence classes for workloads in the digital environment. The multiple workloads are grouped by assigning each of the multiple workloads to one of the multiple clusters. An equivalence class prediction module is trained, using the workload representations, to classify workloads into the multiple equivalence classes by adjusting filters in the equivalence class prediction module to reduce a loss between equivalence classes predicted by the equivalence class prediction module for the training workloads and equivalence classes to which the training workloads are assigned. One of the multiple distance metrics to use in assigning workloads in the digital environment is determined by analyzing performances of the equivalence class prediction modules in classifying the multiple workloads. The equivalence class prediction module corresponding to the determined one of the multiple distance metrics is selected as the equivalence class prediction module to use to classify subsequent workload requests.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
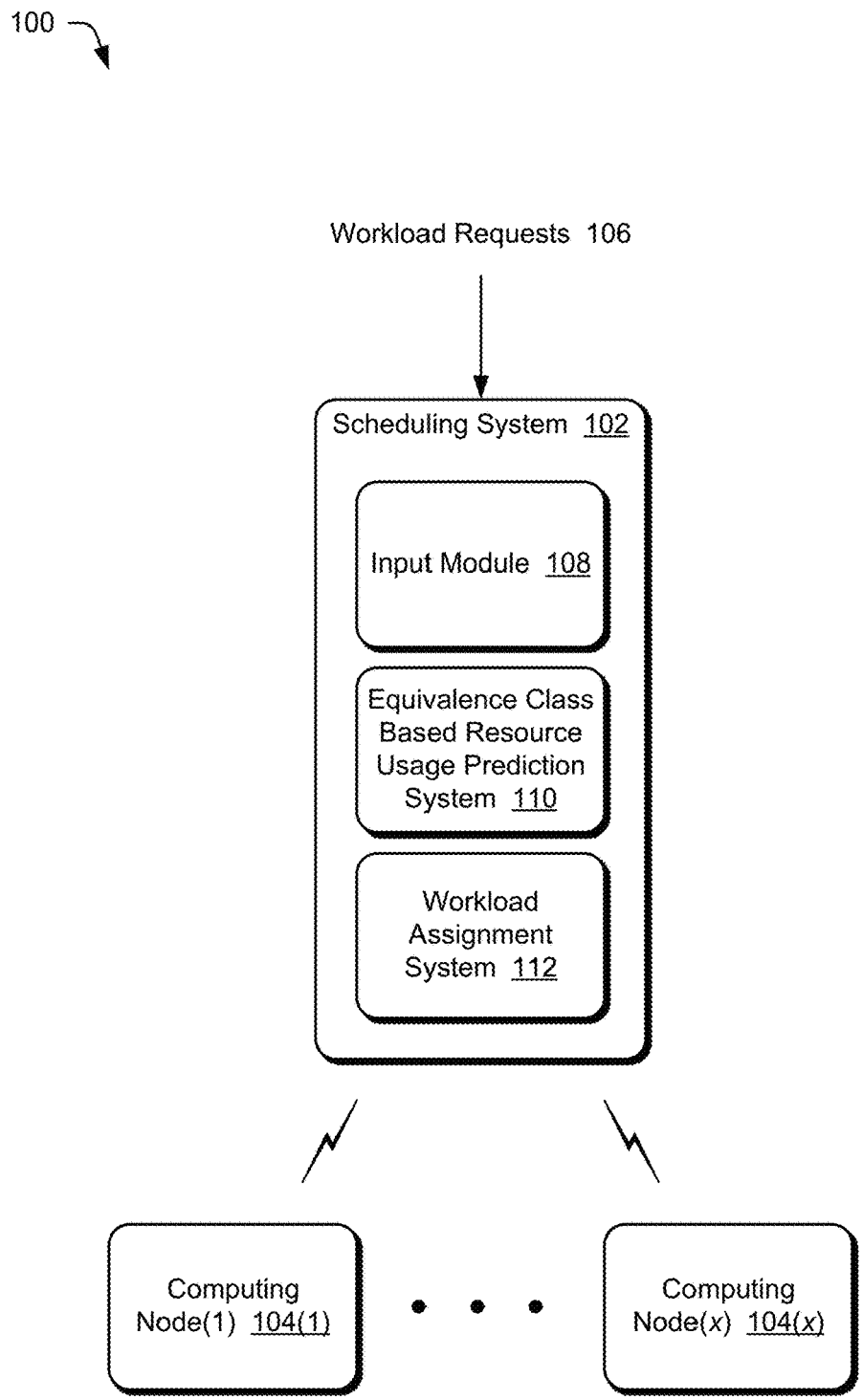
FIG. 1 is an illustration of a digital environment in an example implementation that is operable to employ the workload equivalence class identification for resource usage prediction described herein.

Workload equivalence class identification for resource usage prediction techniques are discussed herein. Generally, a digital environment includes multiple computing nodes and a scheduling system that assigns workloads to computing nodes. The scheduling system includes an equivalence-class-based resource usage prediction system that receives a workload request and predicts an equivalence class for that workload request based on one or both of resource usage over time by the workload request and metadata associated with the workload request. The scheduling system also includes a workload assignment system that assigns the workload request to one or more of the computing nodes based on the predicted equivalence class. The number of equivalence classes is small relative to the total number of workloads that are scheduled. As an example, in some situations the total number of workloads that are scheduled in the digital environment is in the tens or hundreds of thousands but the number of equivalence classes is 10 to 15. This allows different workloads that are similar in terms of resource usage over time to be treated equally by the workload assignment system, alleviating the need for the workload assignment system to evaluate each of the tens or hundreds of thousands of workloads individually.

More specifically, a scheduling system receives workload requests and schedules or assigns the workload requests to different ones of computing nodes in a digital environment. The scheduling system includes an equivalence-class-based resource usage prediction system and a workload assignment system. The equivalence-class-based resource usage prediction system implements functionality to assign each workload request to one of multiple equivalence classes. This allows multiple different workloads with similar characteristics to be assigned to the same equivalence class and treated similarly by the scheduling system (e.g., scheduled based on an expected amount of resources used by the workload over time). Thus, rather than expending the time and computational effort to treat each workload individually, the scheduling system treats multiple similar workloads similarly.

The workload assignment system assigns or schedules, for each workload based on the equivalence class that the workload is assigned to, the workload to one of the computing nodes. Once assigned to a computing node, the scheduling system transfers the workload request to the computing node, which proceeds to execute or perform the requested workload. After performing the workload, the computing node notifies the workload assignment system that the workload has been completed, allowing the workload assignment system to account for the availability of resources on the computing device when assigning future workloads.

With respect to the equivalence-class-based resource usage prediction system, generally a workload request is received and converted into a workload representation. The workload representation is a description of the resource usage of the requested workload over an amount of time, e.g., in a vector form. The workload representation is generated using various resource usage history of the workload request and using any of a variety of different workload representation techniques based on different distance metrics as discussed in more detail below. The workload request is assigned to one of multiple equivalence classes and an indication of the assigned equivalence class is used to predict resource usage by the requested workload. The predicted resource usage is used by the workload assignment system to schedule or assign the workload request to a computing node.

In one or more implementations, the equivalence-class-based resource usage prediction system includes a machine learning system trained to generate equivalence classes. Different digital environments oftentimes have different characteristics, such as different types of workloads, workloads using different resources, variances in timing of workloads using resources, and so forth. The machine learning system is trained to assign workloads to equivalence classes based on the resource usage of the workloads in a particular digital environment. This allows multiple different workloads with similar characteristics to be assigned to the same equivalence class and treated similarly (e.g., scheduled based on an expected amount of resources used by the workload over time) by the scheduling system.

The machine learning system is trained by receiving one or more workload resource usage histories. The workload resource usage history for a workload refers to data describing usage of different resources (e.g., memory, processor, I/O) over time as the workload is performed. The resource usage is recorded at various time intervals, such as every 100 milliseconds, every 10 seconds, every 1 minute, every 5 minutes, and so forth to generate the workload resource usage history for a workload. The workload resource usage histories used by the training system vary, such as being all workload resource usage histories received by the training system or a subset of those workload resource usage histories.

Multiple different distance metric generation systems are used, each one using different features or characteristics of workloads to determine a representation of the workload (e.g., a vector representation of the workload) based on the resource usage of the workload. For each distance metric generation system, a number of clusters into which a set of workload resource usage histories are grouped is determined based on the workload representations generated by the distance metric generation system. This number of clusters is also the number of equivalence classes into which the equivalence class prediction module corresponding to the distance metric generation systems trained to classify workload requests (e.g., each cluster corresponds to one of the equivalence classes).

Multiple machine learning systems (e.g., equivalence class prediction modules or machine learning system included in an equivalence class prediction module) are trained, each corresponding one of the distance metric generation systems, to predict an equivalence class for a workload request using as training data the workload representations for the workload resource usage histories as generated by that distance metric generation system. As different distance metric generation systems determine distances between previous resource usage workloads in different manners, the different trained machine learning systems are different. One of those trained machine learning systems is selected to be the machine learning system used to assign workloads to equivalence classes workloads in the digital environment.

Each distance metric generation system determines the distance between two workloads, based on their workload representations, in any of a variety of different mariners, also referred to as distance metric. The distance metrics allow the workloads to be compared to one another, allowing the distance between workloads to be determined and allowing the workloads to be grouped together based on their similarities. In one or more implementations, the distances are determined using a dynamic time warping technique to find a minimum cost path between the complete matrix of pairwise distances of the two workloads. The dynamic time warping distance between both the CPU usages and memory usages is determined and these two distances are combined, such as by taking an average of the normalized distances. Additionally or alternatively, the distances are determined using a baseline distance metric that is the Euclidean distance on the workload representations including total and average CPU usage, total and average memory usage, job duration and average, standard deviation and normalized standard deviation of the memory-CPU ratio.

For each distance metric generation system, the workload resource usage histories are clustered into multiple different clusters using any of a variety of different clustering techniques, such as k-means clustering techniques (e.g., using k-means++ initialization), k-medoid clustering techniques (e.g., using random medoid initialization), and so forth. The determined distances between the workloads are used to perform the clustering. This clustering includes determining, for example, an indication of the number of clusters, an indication of an approximate center of each cluster, an indication of a number of workloads in each of the clusters, and an indication of which cluster each of the workloads is in.

In one or more implementations, the clustering is performed for each of multiple different numbers of clusters (also referred to herein as k). As an example, the clustering is performed for each integer value of k from 3 to 18. For each distance metric generation system, the clusters generated for each of these different values of k is evaluated and an appropriate value of k for the particular workload resource usage histories is determined (e.g., a value of k that best separates the workload resource usage histories into different clusters). Accordingly, different values of k are oftentimes generated for different distance metric generation systems.

For each distance metric generation system, the corresponding machine learning system is trained to classify workload requests into one of multiple different equivalence classes (the number of different equivalence classes being equal to the selected value of k for the corresponding distance metric generation system). One of those distance metric generation systems (and corresponding machine learning system) is selected by training the machine learning systems and evaluating a gain in prediction accuracy (as compared to a technique that does not employ equivalence classes) and the portion of the workload resource usage histories where gain is observed (the number of workloads assigned to the equivalence classes) of the corresponding trained machine learning system.

The machine learning systems are trained using training data. For each distance metric generation system, the training data includes, for example, the workload representations for the distance metric generation system, an indication of the clusters into which the workload resource usage histories were grouped, and metadata describing the workload requests that resulted in the workload resource usage histories. Examples of types of metadata include, for each workload request that resulted in a workload resource usage history, an indication of a scheduling class of the workload, an indication of a priority of the workload, an indication of processor capacity requested or required by the workload, an indication of memory resources requested or required by the workload, an indication of storage resources requested or required by the workload, combinations thereof, and so forth. The machine learning system is trained, for example, by updating weights of filters in the machine learning system to reduce (e.g., minimize) the loss between the known equivalence class for a workload request and the predicted equivalence class for the workload request generated by the machine learning system.

Including the workload representations in the training data allows the training module to train the machine learning system to generate equivalence classes based on actual workload resource usage histories. However, situations arise in which there is not resource usage history for a particular workload, such as a new workload that has not been run before in the digital environment. Including the metadata in the training data allows the training module to train the machine learning system to predict equivalence classes for workloads that have not been performed before.

After the machine learning systems are trained, the distance metric generation systems are evaluated based on a gain in prediction accuracy between the machine learning system corresponding to the distance metric generation system and a baseline technique (e.g., a technique that does not employ equivalence classes). The machine learning system showing the largest gain in prediction accuracy relative to the baseline technique is selected as the machine learning system to use to assign subsequent workload requests to equivalence classes.

For each subsequent workload request, a resource usage prediction is generated based on the equivalence class for the workload request. This resource usage prediction is thus based on the resource usage history of the requested workload (unless there is no resource usage history for the requested workload). However, rather than generating the resource usage prediction solely based on the resource usage history of the requested workload, the resource usage prediction is based on the equivalence class that the workload request is part of In one or more implementations, the actual resource usage for the requested workload is monitored. The actual resource usage by the requested workload is usable in various different manners, such as being stored to provide additional resource usage history for the next time the workload is requested, being used to further train the machine learning system, and so forth.

In one or more implementations, the correction module 208 receives a resource usage indication 226 for the workload request 106, such as from the workload assignment system 112. The correction module 208 uses the resource usage indication 226 to further train or update the equivalence class prediction module 204. The correction module 208 further trains the equivalence class prediction module 204 (e.g., a machine learning system implemented by the equivalence class prediction module 204) in a manner analogous to that performed by the training module 308 as discussed above.

For example, the machine learning system is further trained by generating a workload representation for the actual resource usage and assigning the requested workload, based on the actual resource usage, to a cluster with the equivalence class corresponding to the cluster being the known equivalence class for the workload request. The weights of filters in the machine learning system are updated to reduce (e.g., minimize) the loss between the known equivalence class for the workload request and the predicted equivalence class for the workload request generated by the machine learning system, and the loss between the known equivalence class for the workload request and the predicted equivalence class for the workload request.

The techniques discussed herein allow temporal-aware vector representations of workloads to be generated resulting in efficient resource usage prediction over time. Further, in situations where sufficient resource usage data is not yet available for a workload, metadata describing the workload is used in place of or to supplement the available resource usage data. Additionally, by having a small number of equivalence classes, the workload assignment system is trained or takes into account those equivalence classes rather than resource usage data for each individual workload, allowing the scheduling system to easily scale to large numbers of workloads.

Furthermore, the techniques discussed herein increase the training data available for training the machine learning system and reduce noise by using the equivalence classes. As multiple workloads are included in the cluster associated with each equivalence class, the resource usage data for all those multiple workloads are used to train the machine learning system, improving the accuracy of the machine learning system and reducing the effects of outlier resource usage data (e.g., which are typically significantly outnumbered by the other resource usage data) on the training of the machine learning system.

Term Descriptions

These term descriptions are provided for purposes of example only and are not intended to be construed as limiting on the scope of the claims.

The term "container" refers to a standard unit of software (e.g., an application, a portion of an application, a microservice), that packages up a piece of code and all its dependencies, so the code runs quickly and reliably from one computing environment to another. Containers are lightweight, stand-alone, executable packages of software that include everything needed to run including code, runtime, system tools, system libraries, and settings.

The term "workload" refers to one or more computational tasks to perform. Examples of workloads include individual sets of commands or operations, applications or services running inside containers or virtual machines using light or full virtualization techniques, or directly on the hardware of the computing nodes, and so forth.

The term "workload resource usage" refers to data describing usage by the workload of various different resources over time while being performed. Examples of workload resource usage include memory usage over time, processor usage over time, input/output (I/O) usage over time, and so forth. The resource usage is recorded at various time intervals, such as every 100 milliseconds, every 1 second, every 10 seconds, and so forth.

The term "workload representation" refers to a description of the resource usage of a workload over an amount of time, and in one or more implementations is in a vector form. Examples of workload representations include aggregate features of the workload resource usage (e.g., total and average CPU usage, total and average memory usage), temporal characteristics derived from the resource usage (e.g., temporal aspects of shape, trend, diurnality), and so forth.

The term "equivalence class" refers to a class or grouping of workloads. Different workloads are grouped into a set of equivalence classes based on the similarity of the workload representations.

The term "computing node" refers to a physical or virtual computing device. Examples of computing nodes include server computers, desktop computers, virtual machines, and so forth.

In the following discussion, an example environment is first described that employs examples of techniques described herein. Example procedures are also described which are performable in the example environment as well as other environments. Consequently, performance of the example procedures is not limited to the example environment and the example environment is not limited to performance of the example procedures.

Example Environment

FIG. 1 is an illustration of a digital environment 100 in an example implementation that is operable to employ the workload equivalence class identification for resource usage prediction described herein. The illustrated environment 100 includes a scheduling system 102 and multiple (x) computing nodes 104. The scheduling system 102 is implemented using one or more of any of a variety of types of computing devices. Examples of the types of computing devices include a server computer, a desktop computer, a mobile device (e.g., assuming a handheld configuration such as a tablet or mobile phone), a wearable device (e.g., augmented reality or virtual reality headsets, smartwatches), a laptop computer, a game console, an automotive computer, and so forth. Thus, implementations of the types of computing devices range from full resource devices with substantial memory and processor resources (e.g., personal computers, game consoles) to a low-resource device with limited memory and/or processing resources (e.g., mobile devices).

Each computing node 104 is implemented using any of a variety of types of computing devices, such as any of the types of computing devices discussed above with respect to implementing scheduling system 102. Different ones of the computing nodes 104 are the same or different types of computing devices. Additionally or alternatively, at least one computing device 104 is implemented as a virtual computing device, such as a virtual machine running on a physical computing device. A virtual machine is runnable on any of a variety of different types of physical computing devices (e.g., any of the types of computing devices discussed above with respect to implementing scheduling system 102).

The scheduling system 102 receives workload requests 106 and schedules or assigns the workload requests to different ones of computing nodes 104. The workload requests 106 are received by an input module 108 from any of various different sources, such as from client computing devices requesting workloads be performed, from a service that operates as an intermediary between the scheduling system 102, from the computing nodes 104, and so forth. One or more workloads are assigned to each computing node 104. Each workload request 106 is a request to execute or perform a workload. A workload is, for example, a container, a set of instructions or operations, and so forth.

The scheduling system 102 also includes an equivalence-class-based resource usage prediction system 110 and a workload assignment system 112. The equivalence-class-based resource usage prediction system 110 implements functionality to assign each workload request 106 to one of multiple equivalence classes. This allows multiple different workloads with similar characteristics to be assigned to the same equivalence class and treated similarly by the scheduling system 102 (e.g., scheduled based on an expected amount of resources used by the workload over time). Thus, rather than expending the time and computational effort to treat each workload individually, the scheduling system 102 treats multiple similar workloads similarly.

The workload assignment system 112 assigns or schedules, for each workload 106 based on the equivalence class that the workload 106 is assigned to, the workload 106 to one of the computing nodes 104. In one or more implementations, the workload assignment system 112 assigns or schedules workloads 106 by predicting the resource usage of the workloads 106. An example of such a workload assignment system can be found in "DeepPlace: Learning to Place Applications in Multi-Tenant Clusters," by Subrata Mitra, Shanka Subhra Mondal, Nikhil Sheoran, Neeraj Dhake, Ravinder Nehra, and Ramanuja Simha, Proceedings of the 10th ACM SIGOPS Asia-Pacific Workshop on Systems (2019), which is hereby incorporated by reference herein in its entirety.

In one or more implementations, different workloads 106, even if assigned to the same equivalence class, are oftentimes assigned to different computing nodes 104. Once assigned to a computing node 104, the scheduling system 102 transfers the workload request 106 to the computing node 104 or otherwise notifies the computing node 104 of the workload request 106. The computing node 104 to which the workload request 106 is assigned proceeds to execute or perform the requested workload. After performing the workload, the computing node 104 notifies the workload assignment system 112 that the workload has been completed, allowing the workload assignment system 112 to account for the availability of resources on the computing device 104 when assigning future workloads.

In general, functionality, features, and concepts described in relation to the examples above and below are employable in the context of the example systems and procedures described herein. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combined in different ways. Thus, individual functionality, features, and concepts described in relation to different example environments, devices, components, figures, and procedures herein are usable in any suitable combinations and are not limited to the particular combinations represented by the enumerated examples in this description.

Equivalence-Class-Based Resource Usage Prediction System Architecture

Figure 2:
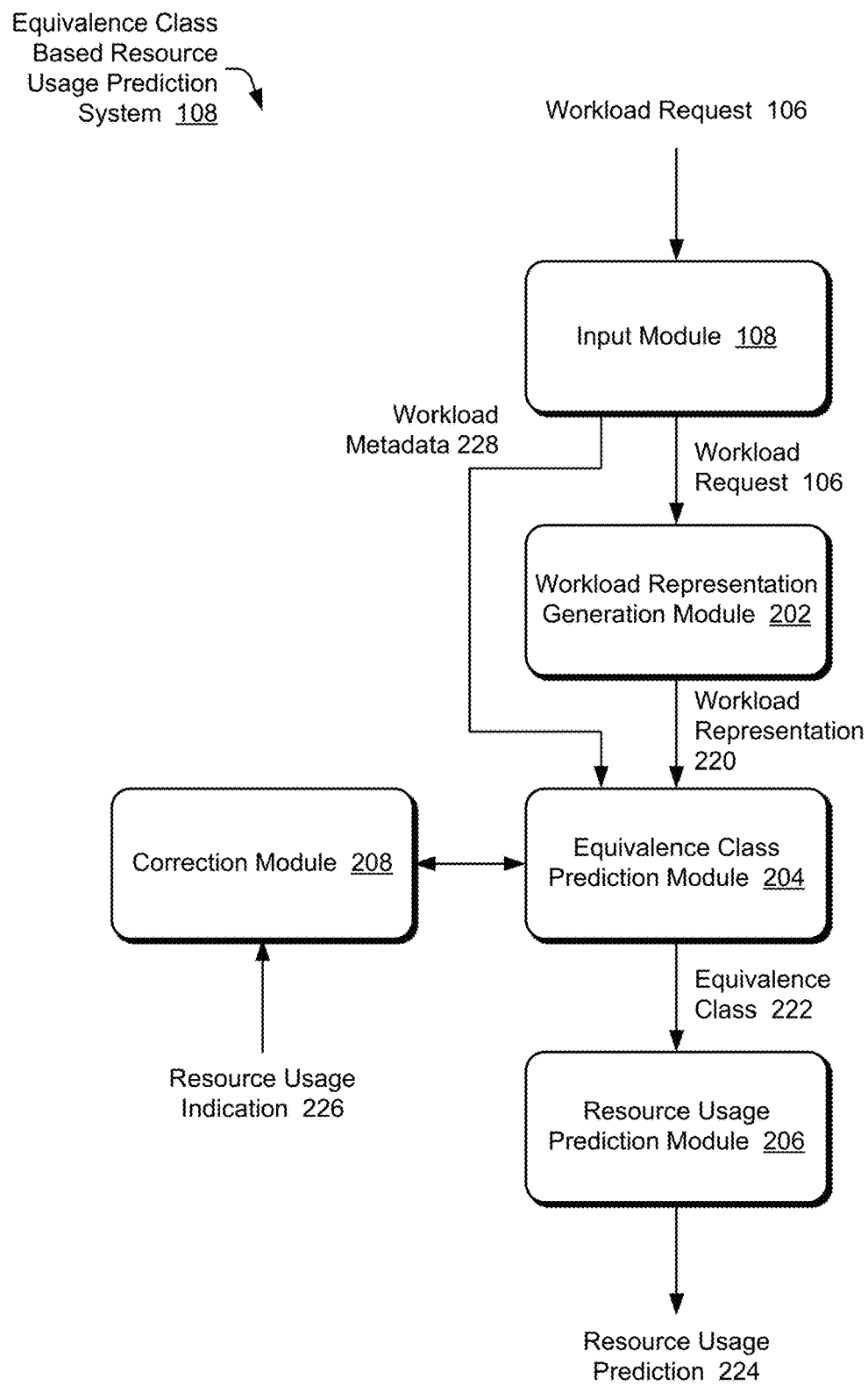
FIG. 2 is an illustration of an example architecture of an equivalence-class based-resource usage prediction system.

FIG. 2 is an illustration of an example architecture of an equivalence-class-based resource usage prediction system 110. The equivalence-class-based resource usage prediction system 110 includes a workload representation generation module 202, an equivalence class prediction module 204, a resource usage prediction module 206, and a correction module 208.

Generally, the workload representation generation module 202 receives a workload request 106. The workload representation generation module 202 converts the workload request 106 into a workload representation 220 that is the same representation as is used to train the equivalence class prediction module 204. The equivalence class prediction module 204 assigns the workload request 106 to one of multiple equivalence classes and provides an indication of the equivalence class 222 for the workload request 106 to the resource usage prediction module 206. The resource usage prediction module 206 determines a resource usage prediction 224 for the workload request 106, based at least in part on the equivalence class 222 of the workload request 106, and outputs the resource usage prediction 224 for the workload request 106. This resource usage prediction 224 is used by the workload assignment system 112 to schedule or assign the workload request 106 to a computing node 104. The correction module 208 receives a resource usage indication 226 for the workload request 106, such as from the workload assignment system 112, from the computing node 104 that performed the workload. The correction module 208 uses the resource usage indication 226 to further train or update the equivalence class prediction module 204.

More specifically, the workload representation generation module 202 implements functionality to convert the workload request 106 into a workload representation 220. Workload requests 106 are received from any of various different sources, such as from client computing devices requesting workloads be performed, from a service that operates as an intermediary between the scheduling system 102, from the computing nodes 104, and so forth. Different workload requests are received from the same or different sources.

The workload representation 220 is a description of the resource usage of the requested workload over an amount of time, and in one or more implementations is in a vector form. The workload representation 220 is generated using any of a variety of different workload representation techniques as discussed in more detail below. The workload representation generation module 202 generates the workload representation 220, using various resource usage history of the workload request 106, in the same manner as is done when generating a workload representation to train the equivalence class prediction module 204 as discussed in more detail below.

The equivalence class prediction module 204 implements functionality to assign the workload request 106, based on the workload representation 220, to one of multiple equivalence classes and provides an indication of the equivalence class 222 for the workload request 106 to the resource usage prediction module 206. In one or more implementations, the equivalence class prediction module 204 implements a machine learning system. A machine learning system refers to a computer representation that is tuned (e.g., trained) based on inputs to approximate unknown functions. In particular, machine learning systems are systems that utilize algorithms to learn from, and make predictions on, known data by analyzing the known data to learn to generate outputs that reflect patterns and attributes of the known data. For instance, machine learning systems include decision trees, support vector machines, linear regression, logistic regression, Bayesian networks, random forest learning, dimensionality reduction algorithms, boosting algorithms, artificial neural networks, deep learning, and so forth.

In one or more implementations, the equivalence class prediction module 204 employs one or more convolutional neural networks (CNNs). A CNN is formed from layers of nodes (i.e., neurons) and includes various layers such as an input layer, an output layer, and one or more hidden layers such as convolutional layers, pooling layers, activation layers, fully connected layers, normalization layers, and so forth.

Figure 3:
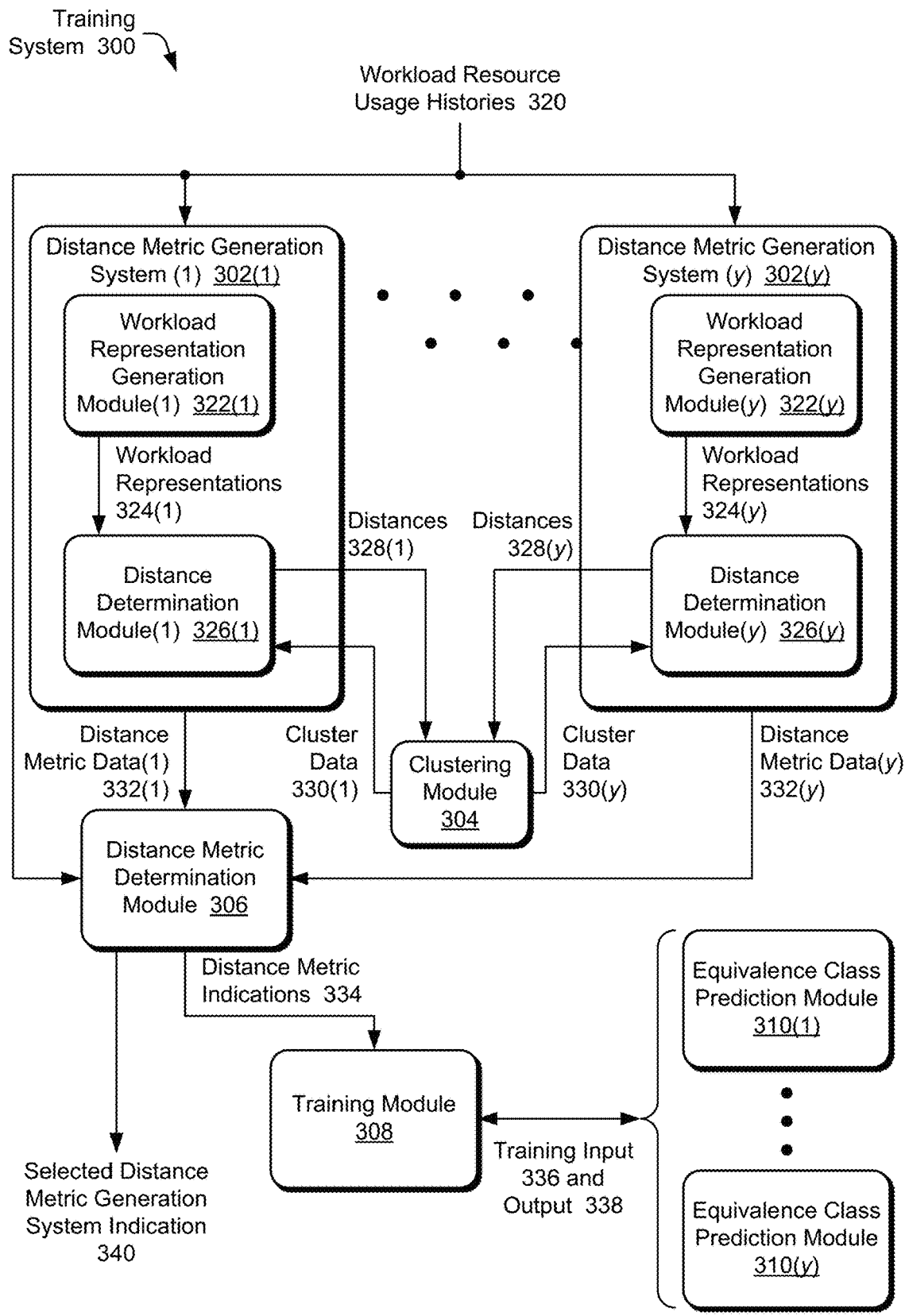
FIG. 3 is an illustration of an example architecture of a training system to train an equivalence class prediction module.

FIG. 3 is an illustration of an example architecture of a training system 300 to train an equivalence class prediction module 204. Different digital environments oftentimes have different characteristics, such as different types of workloads, workloads using different resources, variances in timing of workloads using resources, and so forth. The equivalence class prediction module 204 is trained to assign workloads to equivalence classes based on the resource usage of the workloads in a particular digital environment. This allows multiple different workloads with similar characteristics to be assigned to the same equivalence class and treated similarly (e.g., scheduled based on an expected amount of resources used by the workload over time) by the scheduling system 102.

The training system 300 includes multiple (y) distance metric generation systems $302(1), \ldots, 302(y)$, a clustering module 304, a distance metric determination module 306, a training module 308, and multiple (y) equivalence class prediction modules $310(1), \ldots, 310(y)$. The training system 300 receives as input one or more workload resource usage histories 320. In one or more implementations, the training system 300 receives numerous (e.g., thousands or tens of thousands) workload resource usage histories 320. The workload resource usage history for a workload refers to data describing usage of different resources (e.g., memory, processor, I/O) over time as the workload is performed. The resource usage is recorded at various time intervals, such as every 100 milliseconds, every 10 seconds, every 1 minute, every 5 minutes, and so forth to generate the workload resource usage history for a workload. The workload resource usage histories 320 used by the training system 300 is, for example, all workload resource usage histories received by the training system 300 or a subset of those workload resource usage histories. The workload resource usage histories 320 are typically workload resource usage histories 320 from the digital environment 100 that includes the equivalence-class-based resource usage prediction system 110. Additionally or alternatively, the workload resource usage histories include workload resource usage histories from other digital environments.

Generally, different distance metric generation systems 302 use different features or characteristics of workloads to determine a representation of the workload (e.g., a vector representation of the workload) based on the resource usage of the workload. For each distance metric generation system 302, the clustering module 304 determines, based on the workload representation generated by the distance metric generation systems 302, a number of clusters into which a set of workload resource usage histories 320 are grouped. This number of clusters is also the number of equivalence classes into which the equivalence class prediction module 310 corresponding to the distance metric generation systems 302 is trained to classify workload requests (e.g., each cluster corresponds to one of the equivalence classes).

The training module 308 trains the equivalence class prediction module 310 corresponding to the distance metric generation system 302 to predict an equivalence class for a workload request 106 using as training data the workload representations for the workload resource usage histories 320 as generated by the distance metric generation system 302. Different distance metric generation systems 302 determine distances between previous resource usage workloads in different manners and thus the different trained equivalence class prediction modules 310 are different. The distance metric determination module 306 selects one of those distance metric generation systems 302 to be the equivalence class prediction module 204 of FIG. 2. The distance generation manner used by the selected distance metric generation system 302 is the distance generation manner used to later generate a workload representation for a workload request 106 (e.g., is later used by the workload representation generation module 202 of FIG. 2).

Each distance metric generation system 302 includes a workload representation generation module 322 that generates workload representations based on the workload resource usage histories 320, the workload representations 324 being measurements or characterizations of the resource usage of the workloads. Different workload representation generation modules 322 generate workload representations 324 in different manners. Distance metric generation systems 302 each include a distance determination module 326 that determines the distance between two workloads in any of a variety of different manners, also referred to as distance metric. The distance metrics allow the workloads to be compared to one another, allowing the distance between workloads to be determined and allowing the workloads to be grouped together based on their similarities.

A workload representation generation module 322 generates workload representation 324 in any of a variety of different manners. In one or more implementations, a workload representation 324 includes the aggregate features of the workload resource usage, such as total and average CPU usage, total and average memory usage, workload duration and average, standard deviation and normalized standard deviation of the memory-CPU usage ratio, and so forth.

Additionally or alternatively, a workload representation generation module 322 generates a workload representation using temporal characteristics derived from the resource usage, such as the temporal aspects of shape, trend, diurnality, and so forth. These optionally include auto-correlation, linear trend, and aggregate linear trend. Aggregate features of the workload resource usage are optionally included, such as mean, mean absolute change, and standard deviation of the CPU and memory resource usages.

A distance determination module 326 determines the distance 328 between two workload representations in any of a variety of different manners. In one or more implementations, a distance determination module 326 uses a dynamic time warping technique to find a minimum cost path between the complete matrix of pairwise distances of the two workloads. The dynamic time warping distance between both the CPU usages and memory usages is determined and these two distances are combined, such as by taking an average of the normalized distances.

Additionally or alternatively, a distance determination module 326 determines a baseline distance metric that is the Euclidean distance on the workload representations 324 including total and average CPU usage, total and average memory usage, job duration and average, standard deviation and normalized standard deviation of the memory-CPU ratio.

Each distance metric generation system 302 provides, to the clustering module 304, the distances 328 determined by the distance metric generation system 302. The clustering module 304 implements functionality to cluster, for each distance metric generation systems 302, the workload resource usage histories 320 into multiple different clusters using any of a variety of different clustering techniques, such as k-means clustering techniques (e.g., using k-means++ initialization), k-medoid clustering techniques (e.g., using random medoid initialization), and so forth. The clustering module 304 uses the distances 328 between the workloads as determined by the distance metric generation systems 302 to perform the clustering. Additional information regarding the k-means clustering techniques can be found in "Some methods for classification and analysis of multivariate observations," by J. B. MacQueen, Proc. of the fifth Berkeley Symposium on Mathematical Statistics and Probability, volume 1, pages 281-297, University of California Press (1967), which is hereby incorporated by reference herein in its entirety. Additional information regarding the k-medoid clustering techniques can be found in "Clustering by means of medoids," by L. Kaufmann and P. Rousseeuw, Data Analysis based on the L1-Norm and Related Methods, pages 405-416 (1987), which is hereby incorporated by reference herein in its entirety.

Clustering module 304 returns, to the distance metric generation systems 302, various information regarding the clustering of the workloads, illustrated as cluster data 330. For each distance metric generation system 302, this information includes, for example, an indication of the number of clusters, an indication of an approximate center of each cluster (e.g., in the same vector space as the workload representations 324), an indication of a number of workloads in each of the clusters, and an indication of which cluster each of the workloads is in.

For each distance metric generation system 302, the clustering module 304 performs clustering for each of multiple different numbers of clusters (also referred to herein as k). As an example, the clustering module 304 performs clustering for each integer value of k from 3 to 18. For each distance metric generation system 302, the distances between the clusters are provided to the clustering module 304 by the distance determination module 326. The clustering module 304 evaluates the clusters generated for each of these different values of k and determines an appropriate value of k for the particular workload resource usage histories 320 (e.g., a value of k that best separates the workload resource usage histories 320 into different clusters). Accordingly, different distance metric generation systems 302 oftentimes generate different values of k.

In one or more implementations, the clustering module 304 evaluates the clusters by generating, for each value of k, a silhouette score for the k clusters. The silhouette score measures how similar elements of a cluster are to their own cluster compared to other clusters, e.g., taking into account both the intra-cluster (point-to-mean) and the inter-cluster (point-to-neighboring-cluster) distances. The silhouette score ranges, for example, from −1 to +1 with higher silhouette score values indicating an element is more similar to its own cluster and lower silhouette score values indicating an element is less similar to its own cluster. The silhouette score for a cluster value of k is generated by combining the silhouette scores for the elements in the clusters generated for the cluster value of k, such as by averaging the silhouette scores for the elements in the clusters generated for the cluster value of k. The clustering module 304 selects the value of k having the highest silhouette score. Additional information regarding silhouette scores can be found in "Silhouettes: a graphical aid to the interpretation and validation of cluster analysis," by P. J. Rousseeuw, Journal of computational and applied mathematics, 20:53-65 (1987), which is hereby incorporated by reference herein in its entirety.

The clustering module 304 outputs an indication of the selected value of k as part of cluster data 330. The cluster data 330 indicates to the training module 308 to train the corresponding equivalence class prediction module 310 to classify workload requests 106 into one of multiple different equivalence classes (the number of different equivalence classes being equal to the selected value of k for the distance metric generation system 302).

As discussed above, different distance metric generation systems 302 determine distances between previous resource usage workloads in different manners and the distance metric determination module 306 selects one of those distance metric generation systems 302. Each distance metric generation system 302 provides distance metric data 332 to the distance metric determination module 306. This distance metric data 332 includes, for example, the cluster data 330 received from the clustering module 304 and metadata describing the workload requests that resulted in the workload resource usage histories 320.

The distance metric determination module 306 evaluates the distance metric data 332 received from the multiple distance metric generation systems 302 based on a gain in prediction accuracy (as compared to a technique that does not employ equivalence classes) and the portion of the workload resource usage histories 320 where gain is observed (the number of workloads assigned to the equivalence classes). In one or more implementations, the distance metric determination module 306 communicates with the training module 308 to train the equivalence class prediction modules 310. The distance metric determination module 306 provides a distance metric indication 334 to the training module 308 that includes training data for the training module 308 for each of the equivalence class prediction modules 310. Each equivalence class prediction module 310 corresponds to a different distance metric generation system 302. For each equivalence class prediction module 310, the training data includes, for example, the workload representations 324 for the corresponding distance metric generation system 302, an indication of the clusters into which the workload resource usage histories 320 were grouped by clustering module 304 for the corresponding distance metric generation system 302, and metadata describing the workload requests that resulted in the workload resource usage histories 320. Examples of types of metadata include, for each workload request that resulted in a workload resource usage history 320, an indication of a scheduling class of the workload, an indication of a priority of the workload, an indication of processor capacity requested or required by the workload, an indication of memory resources requested or required by the workload, an indication of storage resources requested or required by the workload, combinations thereof, and so forth.

In one or more implementations, each equivalence class prediction module 310 is a machine learning system as discussed above. The training module 308 trains each equivalence class prediction module 310 corresponding to a distance metric generation system 302 using distance metric indication 334 for that distance metric generation system 302. The training module 308 provides training input 336 (training data) to the machine learning system and receives training output 338 (an equivalence class prediction generated by the machine learning system) from the machine learning system. The machine learning system is trained, for example, by updating weights of filters in the machine learning system to reduce (e.g., minimize) the loss between the known equivalence class for a workload request and the predicted equivalence class for the workload request generated by the machine learning system. The training module 308 uses any of a variety of different loss functions, such as a categorical cross-entropy loss function, a least absolute deviations (L1) loss function, a least square errors (L2) loss function, and so forth.

The equivalence class prediction module 310 is implementable as any of a variety of different machine learning systems (e.g., as discussed above with reference to equivalence class prediction module 204). As one example, the equivalence class prediction module 310 implements a CNN-based multi-variate time-series prediction model (e.g., with two dense layers with rectified linear unit (ReLU) activation followed by an output softmax layer) that is trained with the L1-Loss function with Adam optimizer and a learning rate of 0.001. The history window (past data used) is of size 20 and the prediction is at a horizon of 5 in the future.

Including the workload representations 324 in the training data allows the training module 308 to train the machine learning system to generate equivalence classes based on actual workload resource usage histories. However, situations arise in which there is not resource usage history for a particular workload, such as a new workload that has not been executed or performed before in the digital environment 100. Including the metadata in the training data allows the training module 308 to train the machine learning system to predict equivalence classes for workloads that have not been executed or performed before (e.g., executed or performed anywhere, or executed or performed in the digital environment 100).

After the equivalence class prediction modules 310 are trained, the distance metric determination module 306 evaluates, for each distance metric generation system 302, a gain in prediction accuracy between the equivalence class prediction module 310 corresponding to the distance metric generation system 302 and a technique that does not employ equivalence classes (e.g., the resource usage prediction module 206 of FIG. 2). The distance metric determination module 306 selects one of the equivalence class prediction modules 310 to be used as the equivalence class prediction module 204 of FIG. 2. E.g., the distance metric determination module 306 selects the one of the equivalence class prediction modules 310 having the largest gain in prediction accuracy relative to the technique that does not employ equivalence classes.

In one or more implementations, the distance metric determination module 306 generates a gain in prediction accuracy between an equivalence class prediction module and a technique that does not employ equivalence classes, also referred to as an effective prediction gain (EG), as follows:

$$EG = \frac{1}{n} \sum_{e \in EC} \max(0, G(e)) * |e|$$

where n is the total number of workloads being analyzed, e is an equivalence class from a set of equivalence classes (ECs) that an equivalence class prediction module 310 is being trained for (e.g., the number of clusters for the corresponding distance metric generation systems 302), |e| is the size of equivalence class e (the number of workloads assigned to equivalence class e), and G(e) is the gain for the equivalence class e. The value G(e) is the gain in the correlation between the predicted and actual resource usages of the equivalence class prediction module 310 trained on EC e with respect to a resource usage prediction module that does not employ equivalence classes (e.g., an EC-agnostic model that takes all the examples of resource usage from the workload resource usage histories into account irrespective of the EC). The distance metric determination module 306 selects the equivalence class prediction module 310 having the highest or largest effective prediction gain as the equivalence class prediction module 310 to use for the digital environment 100. The distance metric determination module 306 outputs an indication 340 of the selected distance metric generation system 302 (the distance metric generation system 302 corresponding to the selected equivalence class prediction module 310). In response, the selected equivalence class prediction module 310 is used as the equivalence class prediction module 204 of FIG. 2, and the workload representation generation module 202 generates workload representation 220 in the same manner as the workload representation generation module 322 of the selected distance metric generation system 302.

Although discussed as training multiple equivalence class prediction modules 310, additionally or alternatively the training module 308 trains an equivalence class prediction module 310 for one distance metric generation system 302, has the trained equivalence class prediction module 310 evaluated by the distance metric determination module 306, then re-sets and re-trains the equivalence class prediction module 310 for another distance metric generation system 302. E.g., if a first equivalence class prediction module 310 is trained for a first distance metric generation system 302 and a second equivalence class prediction module 310 is trained for a second distance metric generation system 302, then the training module 308 has the distance metric determination module 306 determine which of the first and second equivalence class prediction modules 310 result in a higher effective prediction gain. The training module 308 then re-sets and re-trains the equivalence class prediction module 310 having the smaller effective prediction gain.

Returning to FIG. 2, for a workload request 106, the equivalence class prediction module 204 receives the workload representation 220 of the workload request 106 and workload metadata 228 of the workload request 106. The workload metadata 228 includes the same one or more types of metadata as were used to train the equivalence class prediction module 204 (e.g., the machine learning system of the equivalence class prediction module 204) as discussed above. The equivalence class prediction module 204 determines the equivalence class 222 based on one or both of the workload metadata 228 and the workload representation 220. In one or more implementations, in situations in which there is a significant amount of resource usage history for the workload request 106, the training of the equivalence class prediction module 204 results in the equivalence class prediction module 204 determining the equivalence class 222 predominately on the workload representation 220. However, in situations in which there is not a significant amount of resource usage history for the workload request 106 (e.g., this is a request for a new and there is not resource usage history), the training of the equivalence class prediction module 204 results in the equivalence class prediction module 204 determining the equivalence class 222 predominately on the workload metadata 228.

The resource usage prediction module 206 receives the equivalence class 222 for the workload request 106 and generates a resource usage prediction module 224 for the requested workload. This resource usage prediction 224 is thus based at least in part on the resource usage history of the requested workload (unless there is no resource usage history for the requested workload). However, rather than generating the resource usage prediction 224 solely based on the resource usage history of the requested workload, the resource usage prediction module 206 generates the resource usage prediction module 224 based on the equivalence class that the workload request 106 is part of.

The resource usage prediction module 206 is implemented in any of a variety of different manners. In one or more implementations, the resource usage prediction module 206 is implemented as a machine learning system, such as a long short-term memory (LSTM) system or other recurrent neural network. Additional information regarding LSTM systems can be found in "Modeling long- and short-term temporal patterns with deep neural networks," by G. Lai, W. C. Chang, Y. Yang, and H. Liu, The 41st International ACM SIGIR Conference on Research, SIGIR '18, pages 95-104 (2018), which is hereby incorporated by reference herein in its entirety. Additionally or alternatively, the resource usage prediction module 206 is implemented in other manners, such as by applying a set of resource usage rules or criteria to the equivalence class 222.

The resource usage prediction 224 is provided to the workload assignment system 112 of FIG. 1, which assigns the requested workload to one of the computing nodes 104 based on the resource usage prediction 224. In one or more implementations, the workload assignment system 112 monitors the actual resource usage for the requested workload (e.g., as indicated by the computing node 104 performing the requested workload). The actual resource usage by the requested workload is usable in various different manners, such as being stored to provide additional resource usage history for the next time the workload is requested, being used to further train the resource usage prediction module 206, and so forth.

In one or more implementations, the correction module 208 receives a resource usage indication 226 for the workload request 106, such as from the workload assignment system 112. The correction module 208 uses the resource usage indication 226 to further train or update the equivalence class prediction module 204. The correction module 208 further trains the equivalence class prediction module 204 (e.g., a machine learning system implemented by the equivalence class prediction module 204) in a manner analogous to that performed by the training module 308 as discussed above. For example, the clustering module 304 assigns or groups the workload representation 220 for the workload request 106 into a cluster, and the corresponding equivalence class is the known equivalence class for the workload request 106. The weights of filters in the machine learning system are updated to reduce (e.g., minimize) the loss between the known equivalence class for the workload request 106 and the predicted equivalence class 222 for the workload request 106 generated by the machine learning system, and the loss between the known equivalence class for a workload request and the predicted equivalence class for the workload request. In one or more implementations the correction module 208 performs the further training of the equivalence class prediction module 204. Additionally or alternatively, the correction module 208 provides the resource usage indication 226 and the workload request 106 to the training module 308, and the training module 308 obtains the workload representation and assigned cluster and further trains the equivalence class prediction module 204.

Example Procedures

The following discussion describes techniques that are implemented utilizing the previously described systems and devices. Aspects of the procedure are implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference is made to FIGS. 1-3.

Figure 4:
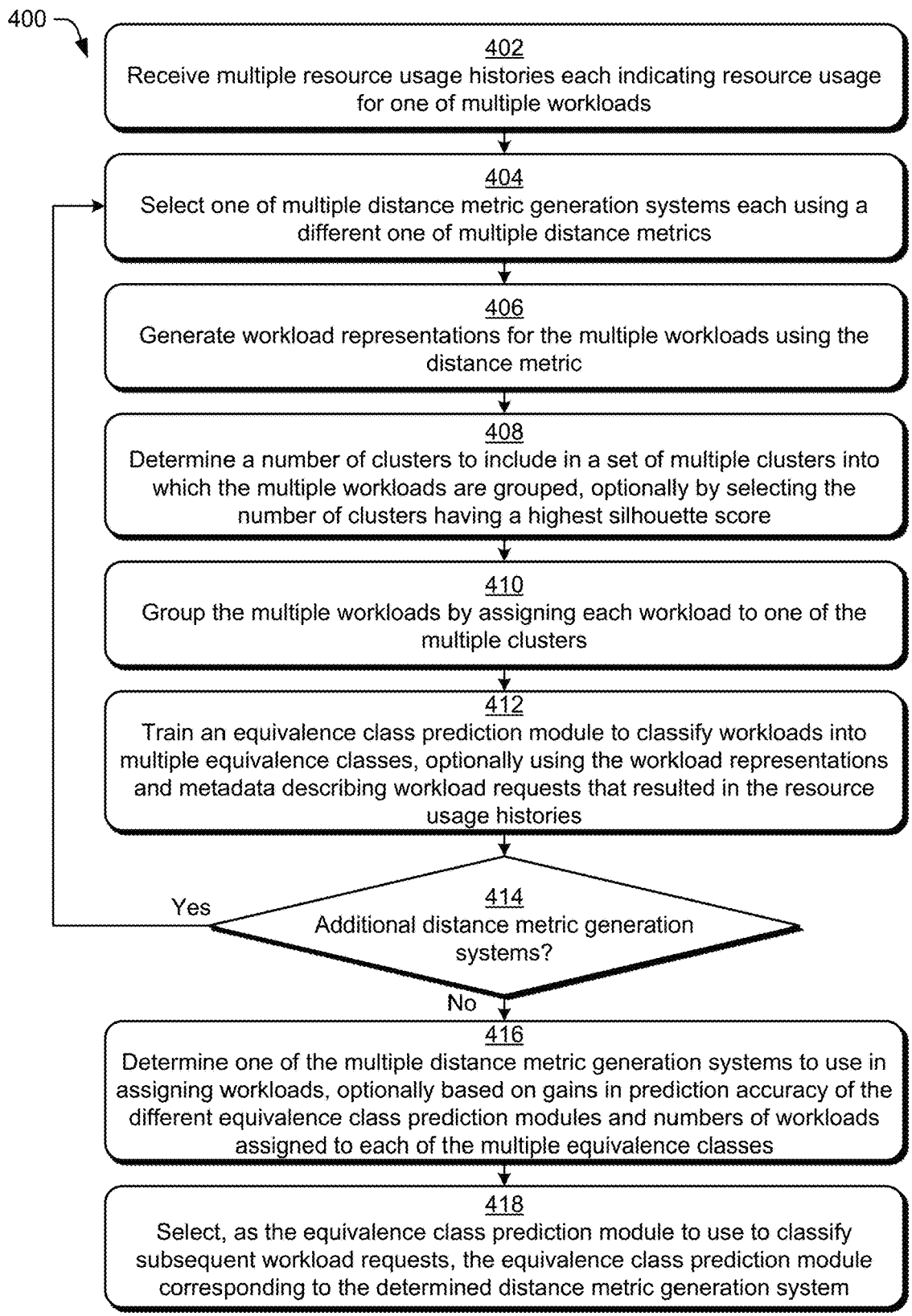
FIG. 4 is a flow diagram depicting a procedure in an example implementation of workload equivalence class identification for resource usage prediction.

FIG. 4 is a flow diagram 400 depicting a procedure in an example implementation of workload equivalence class identification for resource usage prediction. In this example, multiple resource usage histories are received, each indicating resource usage for one of multiple workloads (block 402). These resource usage histories are, for example, resource usage histories for multiple workloads performed by multiple computing nodes in a digital environment.

One of multiple distance metric generation systems is selected (block 404). Each distance metric generation system uses a different one of multiple different distance metrics to determine similarities of various workloads.

Workload representations for the multiple workloads are generated using the selected distance metric (block 406). These workload representations are, for example, in vector form.

A number of clusters to include in a set of multiple clusters into which the multiple workloads are grouped is determined (block 408). Each of the multiple clusters corresponds to one of multiple equivalence classes for workloads in the digital environment. In one or more implementations this determination is made by selecting the number of clusters having a highest silhouette score.

The multiple workloads are grouped by assigning each of the multiple workloads to one of the multiple clusters (block 410).

An equivalence class prediction module is trained to classify workloads into multiple equivalence classes (block 412). This training is performed, for example, using the workload representations and metadata describing workload requests that resulted in the resource usage histories.

A check is made as to whether there are additional distance metric generation systems that have not been selected yet (block 414). If there is at least one distance metric generation system that has not yet been selected, the flow diagram 400 returns to select one of the multiple distance metric generation systems that has not been selected yet.

However, if there is not at least one distance metric generation system that has not yet been selected, the flow diagram 400 proceeds to determine one of the multiple distance metric generation systems to use in assigning workloads (block 416). In one or more implementations this determination is made based on gains in prediction accuracy of the different equivalence class prediction modules and numbers of workloads assigned to each of the multiple equivalence classes.

An equivalence class prediction module is selected as the equivalence class prediction module to use to classify subsequent workload requests (block 418). The selected equivalence class prediction module corresponds to the distance metric generation system determined in block 416.

Figure 5:
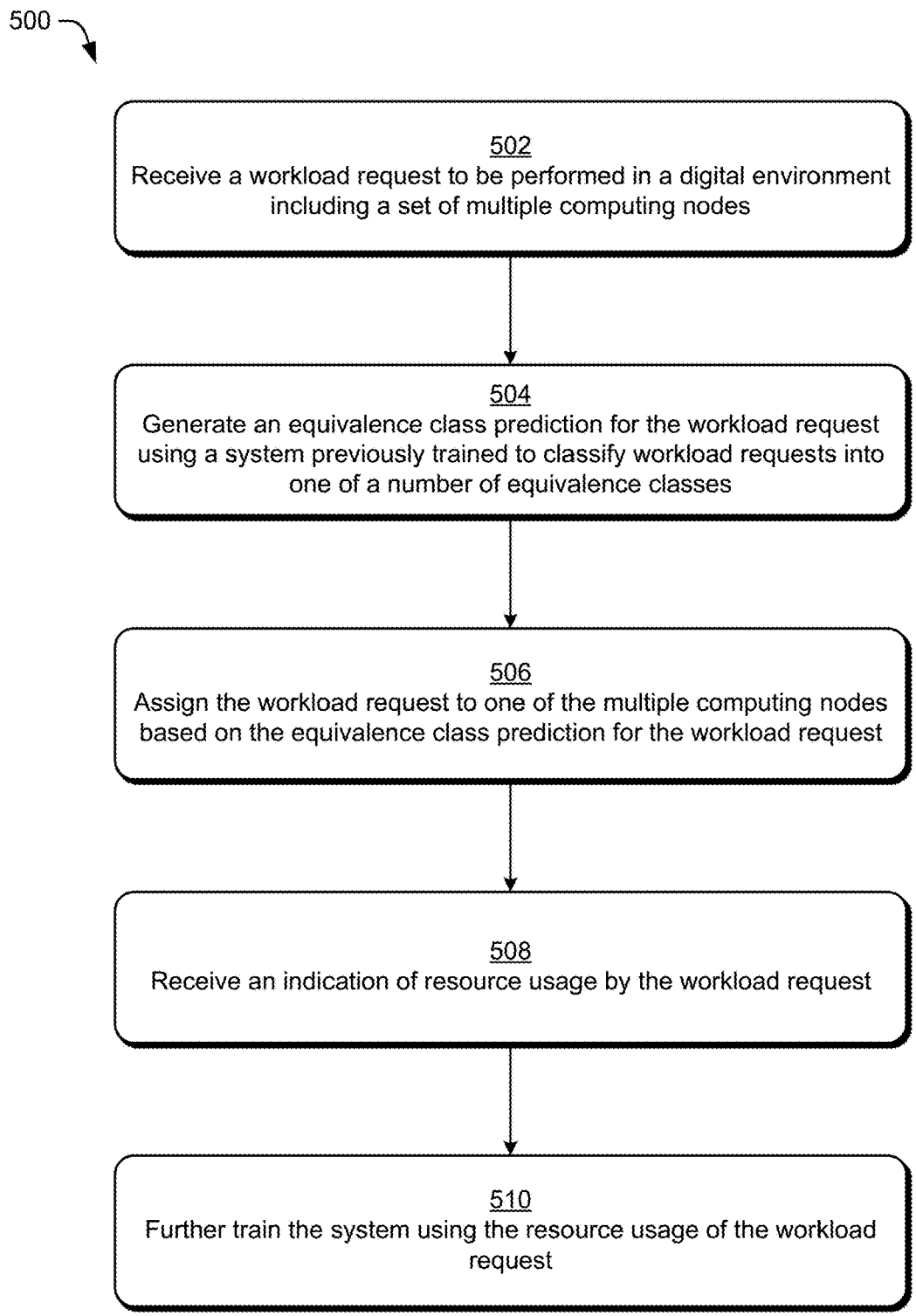
FIG. 5 is a flow diagram depicting another procedure in an example implementation of workload equivalence class identification for resource usage prediction.

FIG. 5 is a flow diagram 500 depicting another procedure in an example implementation of workload equivalence class identification for resource usage prediction. In this example, a workload request to be performed in a digital environment including a set of multiple computing nodes is received (block 502).

An equivalence class prediction for the workload request is generated using a system previously trained to classify workload requests into one of a number of equivalence classes (block 504).

The workload request is assigned to one of the multiple computing nodes based on the equivalence class prediction module for the workload request (block 506).

An in indication of resource usage by the workload request is received (block 508). This indication is an indication of the resource usage of the requested workload when performed on one or more of the multiple computing nodes.

The system is further trained based on the resource usage of the workload request (block 510).

Example System and Device

Figure 6:
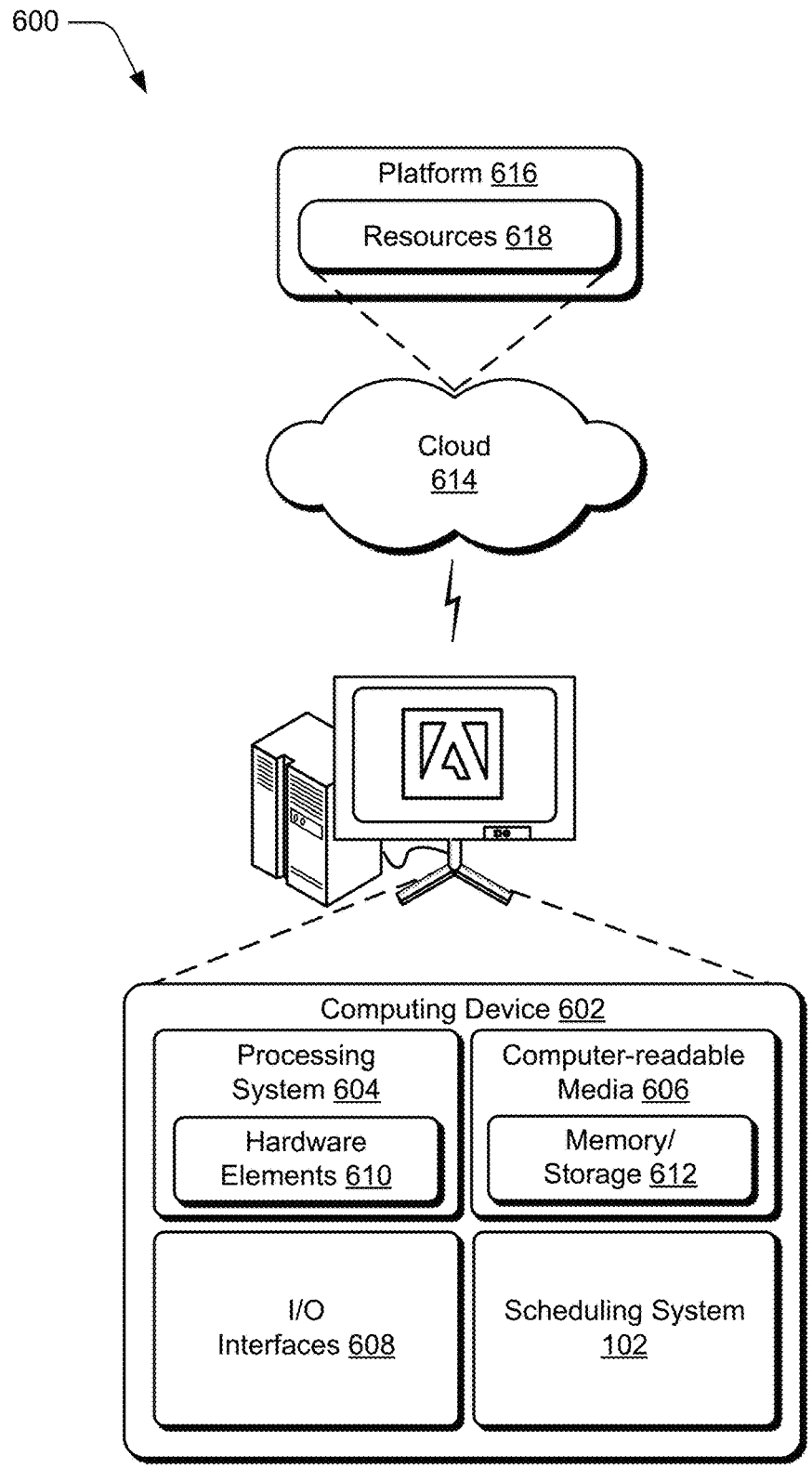
FIG. 6 illustrates an example system including various components of an example device that is implemented as any type of computing device as described and/or utilized with reference to FIGS. 1-5 to implement aspects of the techniques described herein.

FIG. 6 illustrates an example system generally at 600 that includes an example computing device 602 that is representative of one or more computing systems and/or devices that implement the various techniques described herein. This is illustrated through inclusion of the scheduling system 102. The computing device 602 is, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interface 608 that are communicatively coupled, one to another. Although not shown, in one or more implementations the computing device 602 further includes a system bus or other data and command transfer system that couples the various components, one to another. A system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that are configured, for example, as processors, functional blocks, and so forth. The processing system 604 is optionally implemented in hardware as an application specific integrated circuit or other logic device formed using one or more semiconductors. The hardware elements 610 are not limited by the materials from which they are formed, or the processing mechanisms employed therein. For example, in one or more implementations processors are comprised of semiconductor(s) and/or transistors (e.g., electronic integrated circuits (ICs)). In such a context, processor-executable instructions include electronically-executable instructions.

The computer-readable storage media 606 is illustrated as including memory/storage 612. The memory/storage 612 represents memory/storage capacity associated with one or more computer-readable media. The memory/storage component 612 represents memory/storage capacity associated with one or more computer-readable media. The memory/storage component 512 includes one or both of volatile media (such as random access memory (RAM)) and non-volatile media (such as read only memory (ROM), Flash memory, optical disks, magnetic disks, and so forth). The memory/storage component 612 includes one or both of fixed media (e.g., RAM, ROM, a fixed hard drive, and so on) and removable media (e.g., Flash memory, a removable hard drive, an optical disc, and so forth). The computer-readable media 606 is optionally configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 is configured in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

An implementation of the described modules and techniques is optionally stored on or transmitted across some form of computer-readable media. The computer-readable media includes any of a variety of media that is accessible by the computing device 602. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Computer-readable storage media is non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which is accessed by a computer.

"Computer-readable signal media" refers to a signal-bearing medium that is configured to transmit instructions to the hardware of the computing device 602, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that are employed in some implementations to implement at least some aspects of the techniques described herein, such as to perform one or more instructions. Hardware includes, for example, components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are optionally employed to implement various techniques described herein. Accordingly, in one or more implementations software, hardware, or executable modules are implemented as one or more instructions and/or logic embodied on some form of computer-readable storage media and/or by one or more hardware elements 610. The computing device 602 is configured to implement particular instructions and/or functions corresponding to the software and/or hardware modules. Accordingly, implementation of a module that is executable by the computing device 602 as software is achievable at least partially in hardware, e.g., through use of computer-readable storage media and/or hardware elements 610 of the processing system 604. The instructions and/or functions executable/operable by one or more articles of manufacture (for example, one or more computing devices 602 and/or processing systems 604) to implement techniques, modules, and examples described herein.

The techniques described herein are supported by various configurations of the computing device 602 and are not limited to the specific examples of the techniques described herein. Additionally or alternatively, this functionality is implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 include applications and/or data utilizable while computer processing is executed on servers that are remote from the computing device 602. Resources 618 optionally include services provided over the Internet and/or through a subscriber network, such as a cellular or Wi-Fi network.

The platform 616 abstract resources and functions to connect the computing device 602 with other computing devices. The platform 616 also optionally serves to abstract scaling of resources to provide a corresponding level of scale to encountered demand for the resources 618 that are implemented via the platform 616. Accordingly, in an interconnected device embodiment, implementation of functionality described herein is distributed throughout the system 600. For example, the functionality is implemented in part on the computing device 602 as well as via the platform 616 that abstracts the functionality of the cloud 614.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital environment including a set of multiple computing nodes, a method implemented by at least one computing device, the method comprising:
receiving multiple resource usage histories each indicating resource usage for one of multiple workloads that have previously been executed in the digital environment;
training multiple equivalence class prediction modules that each use different distance metrics to classify workloads for predicting resource usages of the workloads, the training including, for each of the different distance metrics:
generating, for each of the multiple workloads, a vector representation of the workload describing the resource usage of the workload over an amount of time, different sets of resource usage characteristics of the multiple workloads being used to generate the vector representation for each of the different distance metrics,
determining a number of clusters to include in a set of multiple clusters into which the multiple workloads are to be grouped, each cluster of the set of multiple clusters corresponding to one of multiple equivalence classes for workloads in the digital environment,
grouping the multiple workloads by assigning each of the multiple workloads to one of the multiple clusters in the set, and
training, using the vector representations, an equivalence class prediction module to classify workloads into the multiple equivalence classes by updating weights of filters in the equivalence class prediction module to reduce a loss between equivalence classes predicted by the equivalence class prediction module for the multiple workloads and equivalence classes to which the multiple workloads are assigned;
selecting, as the equivalence class prediction module to use to classify subsequent workload requests, the equivalence class prediction module having a highest gain in resource usage prediction accuracy relative to a baseline technique for predicting resource usages;
responsive to receiving a workload request, generating a resource usage prediction using the equivalence class prediction module; and
assigning the workload request to a computing node of the set of multiple computing nodes based on the resource usage prediction, thereby initiating the computing node to execute the workload request.

2. The method of claim 1, the determining the number of clusters including determining different numbers of clusters into which the multiple workloads are grouped for each of the different distance metrics.

3. The method of claim 1, the grouping the multiple workloads comprising performing k-means clustering on first vector representations of the workloads generated using a first distance metric, and performing k-medoid clustering on second vector representations of the workloads generated using a second distance metric.

4. The method of claim 1, the determining the number of clusters for a particular distance metric comprising, for each of multiple cluster values, generating a silhouette score measuring how similar elements of each respective cluster are to the respective cluster compared to other clusters, and selecting as the number of clusters a cluster value having a highest silhouette score.

5. The method of claim 1, the equivalence class prediction module is selected from among the multiple equivalence class prediction modules based on a portion of the multiple workloads assigned to each of the multiple equivalence classes showing a gain in the resource usage prediction accuracy over the baseline technique.

6. The method of claim 1, the generating the resource usage prediction including classifying, using the equivalence class prediction module, the workload request into a predicted equivalence class, the resource usage prediction generated based on the predicted equivalence class.

7. The method of claim 6, further comprising:
receiving an indication of actual resource usage to execute the workload request;
grouping the workload request into one of the multiple clusters based on the indication of the actual resource usage; and
further training the equivalence class prediction module to classify workloads by updating the filters in the equivalence class prediction module to reduce an additional loss between the predicted equivalence class and a known equivalence class corresponding to the cluster into which the workload request is grouped.

8. The method of claim 1, the training the multiple equivalence class prediction modules including training, for each of the different distance metrics, the equivalence class prediction module using the vector representations and metadata describing workload requests that resulted in the multiple resource usage histories.

9. The method of claim 8, wherein the metadata describing the workload requests includes one or more of an indication of a scheduling class of the workload requests, an indication of processor capacity request by the workload requests, an indication of memory resources requested by the workload requests, and an indication of storage resources requested by the workload requests.

10. The method of claim 1, wherein the baseline technique is a technique for computing resource usages that does not account for the equivalence classes.

11. In a digital environment including a set of multiple computing nodes, a system comprising:
- a memory component; and
- a processing device coupled to the memory component, the processing device to perform operations including:
  - receiving multiple resource usage histories each indicating resource usage for one of multiple workloads that have previously been executed in the digital environment;
  - training multiple equivalence class prediction modules that each use different distance metrics to classify workloads for predicting resource usages of the workloads, the training including, for each of the different distance metrics:
    - generating, for each of the multiple workloads, a vector representation of the workload describing the resource usage of the workload over an amount of time, different sets of resource usage characteristics of the multiple workloads being used to generate the vector representation for each of the different distance metrics;
    - determining a number of clusters to include in a set of multiple clusters into which the multiple workloads are to be grouped, each cluster of the set of multiple clusters corresponding to one of multiple equivalence classes for workloads in the digital environment, the multiple workloads being assigned to one of the multiple clusters; and
    - training, using the vector representations, an equivalence class prediction module to classify workloads into the multiple equivalence classes by updating weights of filters in the equivalence class prediction module to reduce a loss between equivalence classes predicted by the equivalence class prediction module for the multiple workloads and equivalence classes to which the multiple workloads are assigned;
  - selecting, as the equivalence class prediction module to use to classify subsequent workload requests, the equivalence class prediction module having a highest gain in resource prediction accuracy relative to a baseline technique for predicting resource usages; and
  - responsive to receiving a workload request, assigning the workload request to a computing node of the set of multiple computing nodes based on a resource usage prediction generated using the equivalence class prediction module, thereby initiating the computing node to execute the workload request.

12. The system of claim 11, wherein the determining the number of clusters includes determining different numbers of clusters into which the multiple workloads are grouped for each of the different distance metrics.

13. The system of claim 11, wherein the determining the number of clusters for a particular distance metric includes generating, for each of multiple cluster values, a silhouette score measuring how similar elements of each respective cluster are to the respective cluster compared to other clusters, and selecting, as the number of clusters, a cluster value having a highest silhouette score.

14. The system of claim 11, wherein the equivalence class prediction module is selected from among the multiple equivalence class prediction modules based on a portion of the multiple workloads assigned to each of the multiple equivalence classes showing a gain in resource usage prediction accuracy over the baseline technique.

15. The system of claim 11, the assigning the workload request to the computing node including classifying the workload request into a predicted equivalence class using the equivalence class prediction module, the resource usage prediction generated based on the predicted equivalence class.

16. The system of claim 15, the operations further comprising:
- receiving an indication of actual resource usage to execute the workload request;
- grouping the workload request into one of the multiple clusters based on the indication of the actual resource usage; and
- further training the equivalence class prediction module to classify workloads by updating the filters in the equivalence class prediction module to reduce an additional loss between the predicted equivalence class and a known equivalence class corresponding to the cluster into which the workload request is grouped.

17. The system of claim 11, the training the multiple equivalence class prediction modules including training, for each of the different distance metrics, the equivalence class prediction module using the vector representations and metadata describing workload requests that resulted in the resource usage histories.

18. The system of claim 11, wherein the multiple workloads are assigned by performing a first clustering technique on first vector representations of the workloads generated using a first distance metric, and performing a second clustering technique on second vector representations of the workloads generated using a second distance metric.

19. In a digital environment including a set of multiple computing nodes, a non-transitory computer-readable medium storing executable instructions, which when executed by a processing device, initiate the processing device to perform operations comprising:
- receiving a workload request to be performed in the digital environment;
- generating, using an equivalence class prediction module, an equivalence class prediction for the workload request before the workload request is performed based on a vector representation for the workload request generated using resource usage characteristics of previously executed workloads corresponding to the workload request, the resource usage characteristics varying based on a distance metric of the equivalence class prediction module that is automatically selected for classifying workload requests from among multiple different distance metrics that are usable to classify the workload requests, the equivalence class prediction module having been trained to classify the workload requests into one of a previously determined number of equivalence classes for the equivalence class prediction module;
- assigning the workload request to a computing node of the set of multiple computing nodes based on the equivalence class prediction for the workload request, thereby initiating the computing node to execute the workload request;

determining a known equivalence class based on a received indication of actual resource usage by the workload request when performing the workload request; and further training the equivalence class prediction module using machine learning by updating weights of filters in the equivalence class prediction module to reduce a loss between the equivalence class prediction and the known equivalence class.

20. The non-transitory computer-readable medium of claim 19, the determining the known equivalence class includes generating an additional vector representation of the workload request based on the actual resource usage, the known equivalence class determined based on the additional vector representation.

* * * * *